(12) United States Patent
Cheng et al.

(10) Patent No.: US 12,711,018 B2
(45) Date of Patent: Aug. 18, 2026

(54) DATA BACKUP METHOD AND APPARATUS

(71) Applicant: HUAWEI TECHNOLOGIES CO., LTD., Shenzhen (CN)

(72) Inventors: Xiangle Cheng, Hangzhou (CN); Xiang Shi, Shenzhen (CN); Guangjun He, Shenzhen (CN); Jun Liu, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 19/060,320

(22) Filed: Feb. 21, 2025

(65) Prior Publication Data

US 2025/0208953 A1 Jun. 26, 2025

Related U.S. Application Data

(63) Continuation of application No. PCT/CN2023/100112, filed on Jun. 14, 2023.

(30) Foreign Application Priority Data

Aug. 23, 2022 (CN) ........................ 202211010615.3

(51) Int. Cl.
*G06F 11/1446* (2026.01)

(52) U.S. Cl.
CPC ...... *G06F 11/1461* (2013.01); *G06F 2201/80* (2013.01)

(58) Field of Classification Search
CPC .. G06F 11/1461; G06F 2201/80; G06F 11/14; G06F 9/48; G06F 9/4881; G06N 3/084; G06N 20/00
See application file for complete search history.

(56) References Cited

U.S. PATENT DOCUMENTS

| | | | | |
|---|---|---|---|---|
| 8,091,087 | B2 | 1/2012 | Ali et al. | |
| 8,924,667 | B2 * | 12/2014 | Vasavi | G06F 11/1458 711/161 |

(Continued)

FOREIGN PATENT DOCUMENTS

| | | | |
|---|---|---|---|
| CN | 106502837 | A | 3/2017 |
| CN | 112131051 | A | 12/2020 |

(Continued)

OTHER PUBLICATIONS

Hochreiter et al., “Long Short-Term Memory,” Neural Computation 9, 1735-1780 (1997), Massachusetts Institute of Technology, Total 46 pages (Nov. 1997).

(Continued)

*Primary Examiner* — Maher N Algibhah
(74) *Attorney, Agent, or Firm* — Leydig, Voit & Mayer, Ltd.

(57) ABSTRACT

A data backup method and apparatus are provided. The data backup method includes: obtaining first backup data volumes and first job completion times of a plurality of service objects, wherein the first backup data volumes and the first job completion times correspond to last backup jobs of the plurality of service objects; obtaining a scheduling sequence of next backup jobs of the plurality of service objects based on the first backup data volumes and the first job completion times; and sending a scheduling indication to a client based on the scheduling sequence of the next backup jobs of the plurality of service objects, wherein the scheduling indication includes an identifier of a service object corresponding to a backup job that is to be scheduled.

20 Claims, 9 Drawing Sheets

(56) References Cited

U.S. PATENT DOCUMENTS

| | | | | |
|---|---|---|---|---|
| 10,198,324 | B2 | 2/2019 | Kottomtharayil | |
| 11,061,780 | B1 * | 7/2021 | Marelas | G06F 11/1451 |
| 11,249,862 | B2 * | 2/2022 | Wang | G06F 11/3055 |
| 11,263,093 | B2 * | 3/2022 | Tang | G06F 11/3419 |
| 2011/0191777 | A1 | 8/2011 | Bansal et al. | |
| 2012/0102088 | A1 | 4/2012 | Bindal et al. | |
| 2013/0262925 | A1 * | 10/2013 | Dhanalakoti | G06F 11/1461 714/16 |
| 2021/0117283 | A1 * | 4/2021 | Wang | G06F 11/1466 |
| 2021/0397474 | A1 | 12/2021 | Srinivasan et al. | |

FOREIGN PATENT DOCUMENTS

| | | | |
|---|---|---|---|
| CN | 112685224 | A | 4/2021 |
| CN | 113076224 | A | 7/2021 |
| CN | 114860160 | A | 8/2022 |

OTHER PUBLICATIONS

Sutskever et al., "Sequence to Sequence Learning with Neural Networks," arXiv:1409.3215v3 [cs.CL], Total 9 pages (Dec. 2014).

Cheng et al., "Physics Constrained Flow Neural Network for Short-Timescale Predictions in Data Communications Networks," arXiv:2112.12321v1 [cs.LG], Total 11 pages (Dec. 2021).

* cited by examiner

DATA BACKUP METHOD AND APPARATUS

CROSS-REFERENCE TO RELATED APPLICATIONS

This application is a continuation of International Application No. PCT/CN2023/100112, filed on Jun. 14, 2023, which claims priority to Chinese Patent Application No. 202211010615.3, filed on Aug. 23, 2022. The disclosures of the aforementioned applications are hereby incorporated by reference in their entirety.

TECHNICAL FIELD

Embodiments of this application relate to data backup technologies, and in particular, to a data backup method and apparatus.

BACKGROUND

A backup job is that a client periodically generates duplicates for data of different service objects and transmits the duplicates to a background backup system within a predetermined time window. Backup orchestration is aimed at designing a set of efficient backup transmission resource (such as a transmission time and bandwidth) allocation and scheduling solutions to allocate limited backup resources to backup jobs waiting for transmission, so that as many backup jobs as possible can be completed within predetermined time windows, and a backup bandwidth/throughput of the entire system is maximized.

In a related technology, a backup orchestration solution based on dynamic scheduling is used, and is implemented by dynamically setting a job priority and/or a job start time. The job priority is set by a client, and the job start time is dynamically calculated based on a real-time status of the system. Therefore, a scheduling effect of the solution is greatly affected by manual experience of the client and random operations, which may lead to insufficient matching precision between the backup system and a dynamic characteristic of each backup job. In addition, during execution of the backup job, a preemptive interruption operation is required to adapt to dynamic fluctuation after the job is started. However, the preemptive interruption operation causes extra interruption and resumption overheads, and affects a system throughput and service level agreement (SLA) time window compliance of the job.

SUMMARY

Embodiments of this application provide a data backup method and apparatus, to fully consider matching precision between a backup system and a dynamic characteristic of each backup job, avoid manual intervention in scheduling of a plurality of backup jobs, and improve SLA time window compliance of the jobs.

According to a first aspect, embodiments of this application provide a data backup method, including: obtaining first backup data volumes and first job completion times of a plurality of service objects, where the first backup data volumes and the first job completion times correspond to last backup jobs of the plurality of service objects; obtaining a scheduling sequence of next backup jobs of the plurality of service objects based on the first backup data volumes and the first job completion times; and sending a scheduling indication to a client based on the scheduling sequence of the next backup jobs of the plurality of service objects, where the scheduling indication includes an identifier of a service object corresponding to a backup job that is to be scheduled.

In this embodiment of this application, the scheduling sequence of the next backup jobs of the plurality of service objects is obtained through prediction based on the backup data volumes and the job completion times of the last backup jobs of the plurality of service objects by using a machine learning model, so that matching precision between a backup system and a dynamic characteristic of each backup job can be fully considered, manual intervention in scheduling of the plurality of backup jobs can be avoided, and SLA time window compliance of the jobs can be improved.

The plurality of service objects of the client may include service objects of servers that support various operating systems (for example, Windows, Unix, Linux, and VMware), service objects of various databases (for example, Oracle, SQL, and DB2), and service objects of other devices or services that have a data backup requirement. This is not specifically limited in this embodiment of this application. It should be understood that one client may include a plurality of service objects. For example, a plurality of VMs are created on a server, and one VM is one service object. For another example, database services for a plurality of users are created in a database, and one database service is one service object.

The first backup data volumes and the first job completion times correspond to the last backup jobs of the plurality of service objects. The data backup requirement of the service object is a long-term and periodically repeated process. For example, a service object periodically backs up production data from a client to a background backup system at a specific backup frequency (for example, every hour, every day, every week, or every month) by using a switching network. Therefore, the service object may consider each data transmission process as a backup job. The backup job of the service object is periodically started and executed. Based on this, in this embodiment of this application, a backup job that is to be executed in a next periodicity is referred to as a next backup job of the service object, and a backup job that has been executed in a last periodicity before the backup job that is to be executed in the next periodicity is referred to as a last backup job of the service object.

After all backup data of a service object is transmitted, that is, after a last backup job of the service object is completed, the client may report a backup data volume and a job completion time (JCT) of the backup job to the backup system. In this way, after a period of time, for example, by the end of each day or each month, the backup system may obtain backup data volumes and job completion times (that is, the first backup data volumes and the first job completion times) of last backup jobs of a plurality of service objects.

In this embodiment of this application, the backup system may obtain the scheduling sequence of the next backup jobs of the plurality of service objects by using the following two methods:

1. The first backup data volumes and the first job completion times are input into a first machine learning model, to obtain the scheduling sequence of the next backup jobs of the plurality of service objects.

2. The first backup data volumes and the first job completion times are input into a second machine learning model, to obtain second backup data volumes and second job completion times of the plurality of service objects. The second backup data volumes and the second job completion times correspond to the next backup jobs of the plurality of service objects. The scheduling sequence of the next backup jobs of the plurality of service objects is obtained based on the second backup data volumes and the second job completion times.

After obtaining the second backup data volumes and the second job completion times of the plurality of service objects, for any one (for example, a first service object) of the plurality of service objects, the backup system may calculate a ratio of a second backup data volume corresponding to the first service object to a second job completion time corresponding to the first service object, to obtain an easiness degree of a next backup job of the first service object. In other words, the backup system needs to calculate an easiness degree of a next backup job of each of the plurality of service objects. The easiness degree is a ratio of a second backup data volume to a second job completion time. A larger ratio indicates that the next backup job is easier, and a smaller ratio indicates that the next backup job is more difficult.

Then, a remaining start time of the next backup job of the first service object is obtained based on the second job completion time corresponding to the first service object.

The backup system may calculate a difference of a latest job end time MaxEndTime (the information is reported to the backup system when the service object is registered or reconfigured) from the second job completion time and a current time t, to obtain the remaining start time of the next backup job.

After easiness degrees of the next backup jobs of the plurality of service objects and remaining start times of the next backup jobs of the plurality of service objects are all obtained, the scheduling sequence of the next backup jobs of the plurality of service objects is obtained based on the easiness degrees of the next backup jobs of the plurality of service objects and the remaining start times of the next backup jobs of the plurality of service objects.

For the first service object, after obtaining the easiness degree of the next backup job of the first service object and the remaining start time of the next backup job of the first service object, the backup system may calculate a ratio of the easiness degree of the next backup job of the first service object to the remaining start times of the next backup jobs of the plurality of service objects, to obtain a scheduling threshold of the next backup job of the first service object. The backup system may obtain scheduling thresholds of the next backup jobs of all the service objects by using the same calculation method. A larger scheduling threshold indicates that the next backup job is easy to complete and urgent, and needs to be started as soon as possible. A smaller scheduling threshold indicates that the next backup job is more difficult to complete and not urgent, and may be postponed. Then, the thresholds of the next backup jobs of the plurality of service objects are ranked in descending order, to obtain the scheduling sequence of the next backup jobs of the plurality of service objects.

Two machine learning models are used in the foregoing two methods, and a difference lies in that outputs of the machine learning models are different. This is related to training processes of the machine learning models. In addition, the machine learning models may further output other information, to assist in obtaining the scheduling sequence of the next backup jobs of the plurality of service objects. Therefore, the outputs of the machine learning models are not limited in this embodiment of this application. Regardless of which machine learning model is used, a system throughput and SLA time window compliance of the jobs are fully considered during training. The matching precision between the backup system and the dynamic characteristic of each backup job is trained in combination with the dynamic characteristic of the backup job (for example, a backup data volume, a job completion time, an earliest job start time, and a latest job end time of the backup job), so that a prediction result of the machine learning model is closer to an actual execution result.

In this embodiment of this application, the scheduling sequence of the next backup jobs of the plurality of service objects may alternatively be obtained by using other methods than the foregoing two methods. This is not specifically limited, either.

In a possible implementation, the backup system may first determine whether to cancel the next backup job of the first service object; and when the next backup job of the first service object is not canceled, obtain the scheduling sequence of the next backup jobs of the plurality of service objects based on the easiness degrees of the next backup jobs of the plurality of service objects and the remaining start times of the next backup jobs of the plurality of service objects.

In this embodiment of this application, the backup system may determine whether the remaining start time of the next backup job of the first service object is less than 0. When the remaining start time of the next backup job of the first service object is less than 0 (indicating that a latest end time of the next backup job of the first service object has passed), a cancellation probability of the next backup job of the first service object is calculated (for example, 1-p is calculated, where p is a preset probability value, a larger value of 1-p indicates the next backup job of the first service object has a higher cancellation probability and is more likely to be canceled, and a smaller value of 1-p indicates the next backup job of the first service object has a smaller cancellation probability and is less likely to be canceled). When the cancellation probability of the next backup job of the first service object is greater than a preset threshold, it is determined to cancel the next backup job of the first service object. When the cancellation probability of the next backup job of the first service object is less than or equal to the preset threshold, it is determined not to cancel the next backup job of the first service object. When the remaining start time of the next backup job of the first service object is greater than or equal to 0 (indicating that the latest end time of the next backup job of the first service object has not arrived), it is determined not to cancel the next backup job of the first service object.

In this way, scheduling may be performed only for a next backup job of a service object that is not canceled, thereby avoiding unnecessary scheduling caused by scheduling a next backup job of a service object that needs to be canceled, and improving scheduling efficiency of the next backup jobs of the plurality of service objects.

After obtaining the scheduling sequence of the next backup jobs of the plurality of service objects, the backup system may sequentially select, from a scheduling queue based on a quantity of real-time available parallel threads and the scheduling sequence, a backup job at a queue head as a backup job that is to be scheduled, and send a scheduling indication to the client. The scheduling indication includes an identifier of the backup job that is to be scheduled. For example, if the quantity of real-time available parallel threads is 2, two backup jobs can be scheduled currently. Therefore, the backup system selects two backup jobs (for example, Job Ids are 1 and 2) from the queue head of the scheduling queue, and sends a scheduling indication including the Job Id 1 and the Job Id 2 to the client.

Optionally, after the next backup jobs of the plurality of service objects are completed, the client further reports backup data volumes and job completion times of the backup jobs of the plurality of service objects to the backup system. Each time a backup job of a service object is completed, the client may choose to send a backup data volume and a job completion time of the backup job. Alternatively, the client may choose to send the backup data volumes and the job completion times of the backup jobs of the plurality of service objects at a time after the backup jobs of the plurality of service objects are completed. This is not specifically limited herein.

In a possible implementation, after the sending a scheduling indication to a client based on the scheduling sequence of the next backup jobs of the plurality of service objects, the method further includes: receiving a transmit rate and a receive rate of a backup job of a second service object in a last periodicity that are sent by the client, where the backup job of the second service object is being executed; obtaining a rate limit of the backup job of the second service object in a next periodicity based on the transmit rate and the receive rate; and sending a rate limiting indication to the client, where the rate limiting indication includes the rate limit of the backup job of the second service object in the next periodicity.

In this embodiment of this application, rate limits of the backup jobs of the plurality of service objects in the next periodicity are predicted based on transmit rates and receive rates of the backup jobs of the plurality of service objects in the last periodicity by using a machine learning model, so that a port bandwidth resource can be used best based on real-time transmission characteristics of the jobs, thereby improving a system throughput, avoiding manual intervention in scheduling of the plurality of backup jobs, and improving system transmission efficiency.

The backup job of the second service object is being executed. Therefore, in this embodiment of this application, rate limiting may be performed for a backup job that is being executed (the client is sending backup data of the backup job to the backup system), so that a port bandwidth resource can be used best based on a real-time transmission characteristic of the job, thereby improving a system throughput.

As described above, the backup job of the service object is periodically executed. The backup job being executed may be considered as being in a current periodicity (which may also be referred to as a next periodicity), and in this case, a periodicity in which the backup job is executed last time may be considered as a last periodicity of the backup job.

Generally, a transmit rate and a receive rate of a backup job in a periodicity change dynamically. Therefore, in this embodiment of this application, a rate reporting periodicity may be set, and the client reports, to the backup system based on the reporting periodicity, the transmit rate and the receive rate of the backup job of the second service object in the last reporting periodicity. The transmit rate and the receive rate are considered as an average transmit rate and an average receive rate in the last reporting periodicity, or may be considered as a weighted average transmit rate and a weighted average receive rate in the last reporting periodicity. This is not specifically limited herein.

The backup system may input the transmit rate and the receive rate into a third machine learning model, to obtain a receive rate of the backup job of the second service object in the next periodicity; and then obtain the rate limit of the backup job of the second service object in the next periodicity based on the receive rate of the backup job of the second service object in the next periodicity.

The backup system may obtain a preset bandwidth of a first port, where the first port is configured to execute the backup job of the second service object; obtain a sum of receive rates, in the next periodicity, of all backup jobs transmitted by the first port; and obtain the rate limit of the backup job of the second service object in the next periodicity based on the preset bandwidth of the first port, the receive rate of the backup job of the second service object in the next periodicity, and the sum of the receive rates. This is represented in the following formula:

$$\text{Rate limit of a backup job } i = \frac{\text{Preset bandwidth of the first port} \times \text{Predicted receive rate of the backup job } i}{\text{Sum of the predicted receive rates of all the backup jobs transmitted by the first port}}$$

The predicted receive rate of the backup job i is the receive rate of the backup job of the second service object in the next periodicity, and the sum of the predicted receive rates of all the backup jobs transmitted by the first port is the sum of the receive rates of all the backup jobs transmitted by the first port in the next periodicity.

It should be noted that, in this embodiment of this application, the rate limit of the backup job of the second service object in the next periodicity may alternatively be calculated by using other methods. This is not specifically limited herein.

The backup system sends the rate limit of the backup job of the second service object in the next periodicity to the client by using the rate limiting indication, so that the client may limit a transmit rate of backup data of the backup job of the second service object based on the rate limit.

The client may limit the transmit rate of the backup data of the backup job of the second service object based on the rate limit, so that a port bandwidth resource can be used best based on a real-time transmission characteristic of the job, thereby improving a system throughput.

In a possible implementation, the method further includes: obtaining a target machine learning model through training. The target machine learning model includes at least one of the first machine learning model, the second machine learning model, and the third machine learning model, the first machine learning model is used to predict a scheduling sequence of next backup jobs of service objects, the second machine learning model is used to predict a second backup data volume and a second job completion time of a service object, and the third machine learning model is used to predict a receive rate of a backup job of a service object in a next periodicity.

Training data is data used to train a machine learning model, and the training data may vary with different structures, parameters, functions, and the like of the machine learning model.

In this embodiment of this application, the target machine learning model includes at least one of the first machine learning model, the second machine learning model, and the third machine learning model, the first machine learning model is used to predict a scheduling sequence of next backup jobs of service objects, the second machine learning model is used to predict a second backup data volume and a second job completion time of a service object, and the third machine learning model is used to predict a receive rate of a backup job of a service object in a next periodicity.

Optionally, the backup system may obtain historical backup data volumes and historical job completion times of the plurality of service objects, where the historical backup data volumes and the historical job completion times correspond to completed backup jobs of the plurality of service objects; obtain a preset machine learning model; input the historical backup data volumes and the historical job completion times of the plurality of service objects into the preset machine learning model, to obtain predicted backup data volumes and predicted job completion times of the plurality of service objects; and perform convergence training based on the predicted backup data volumes and the predicted job completion times to obtain the target machine learning model.

Optionally, the backup system may obtain historical receive rates and historical transmit rates of the completed backup jobs of the plurality of service objects; obtain a preset machine learning model; input the historical receive rates and the historical transmit rates into the preset machine learning model, to obtain predicted receive rates of backup jobs of the plurality of service objects; and perform convergence training based on the predicted receive rates to obtain the target machine learning model.

The foregoing two training methods mainly differ in training data. Optionally, the methods may also differ in preset machine learning models, including different structures, parameters, and the like of the preset machine learning models. This is not specifically limited in this embodiment of this application.

In a process of training the machine learning model, because it is expected that an output of the machine learning model is as close as possible to a value that is actually expected to be predicted, a predicted value of a current network may be compared with a target value that is actually expected, and then a weight vector of each layer of the machine learning model is updated based on a difference between the two (certainly, an initialization process is usually performed before the first update, that is, a parameter is preconfigured for each layer in the machine learning model). For example, if the predicted value of the network is higher, the weight vector is adjusted to obtain a lower predicted value. The weight vector is continuously adjusted until the deep machine learning model can predict the target value that is actually expected or a value that is quite close to the target value that is actually expected. Therefore, "how to compare the predicted value with the target value to obtain the difference" needs to be predefined. This leads to a loss function or an objective function. The loss function and the objective function are important equations for measuring the difference between the predicted value and the target value. The loss function is used as an example. A higher output value (loss) of the loss function indicates a larger difference. In this case, training of the machine learning model is a process of minimizing the loss.

For the machine learning model, an error back propagation (BP) algorithm may be further used to correct a value of a parameter in an initial model in the training process, so that a reconstruction error loss of the model becomes smaller. Specifically, an input signal is transferred forward until an error loss occurs in an output, and the parameter in the initial model is updated based on back propagation error loss information, so that the error loss converges. The back propagation algorithm is an error-loss-centered back propagation motion, intended to obtain an optimal parameter, such as a weight matrix, of the machine learning model.

According to a second aspect, this application provides a data backup apparatus, including: an obtaining module, configured to obtain first backup data volumes and first job completion times of a plurality of service objects, where the first backup data volumes and the first job completion times correspond to last backup jobs of the plurality of service objects; a scheduling module, configured to obtain a scheduling sequence of next backup jobs of the plurality of service objects based on the first backup data volumes and the first job completion times; and a sending module, configured to send a scheduling indication to a client based on the scheduling sequence of the next backup jobs of the plurality of service objects, where the scheduling indication includes an identifier of a service object corresponding to a backup job that is to be scheduled.

In a possible implementation, the scheduling module is configured to input the first backup data volumes and the first job completion times into a first machine learning model, to obtain the scheduling sequence of the next backup jobs of the plurality of service objects.

In a possible implementation, the scheduling module is configured to: input the first backup data volumes and the first job completion times into a second machine learning model, to obtain second backup data volumes and second job completion times of the plurality of service objects, where the second backup data volumes and the second job completion times correspond to the next backup jobs of the plurality of service objects; and obtain the scheduling sequence of the next backup jobs of the plurality of service objects based on the second backup data volumes and the second job completion times.

In a possible implementation, the scheduling module is configured to: calculate a ratio of a second backup data volume corresponding to a first service object to a second job completion time corresponding to the first service object, to obtain an easiness degree of a next backup job of the first service object, where the first service object is any one of the plurality of service objects; obtain a remaining start time of the next backup job of the first service object based on the second job completion time corresponding to the first service object; and after easiness degrees of the next backup jobs of the plurality of service objects and remaining start times of the next backup jobs of the plurality of service objects are all obtained, obtain the scheduling sequence of the next backup jobs of the plurality of service objects based on the easiness degrees of the next backup jobs of the plurality of service objects and the remaining start times of the next backup jobs of the plurality of service objects.

In a possible implementation, the scheduling module is further configured to: determine whether to cancel the next backup job of the first service object; and when the next backup job of the first service object is not canceled, obtain the scheduling sequence of the next backup jobs of the plurality of service objects based on the easiness degrees of the next backup jobs of the plurality of service objects and the remaining start times of the next backup jobs of the plurality of service objects.

In a possible implementation, the scheduling module is configured to: calculate ratios of the easiness degrees of the next backup jobs of the plurality of service objects to the remaining start times of the next backup jobs of the plurality of service objects, to obtain scheduling thresholds of the next backup jobs of the plurality of service objects; and rank the thresholds of the next backup jobs of the plurality of service objects in descending order, to obtain the scheduling sequence of the next backup jobs of the plurality of service objects.

In a possible implementation, the scheduling module is configured to: determine whether the remaining start time of the next backup job of the first service object is less than 0; when the remaining start time of the next backup job of the first service object is less than 0, calculate a cancellation probability of the next backup job of the first service object; and when the cancellation probability of the next backup job of the first service object is greater than a preset threshold, determine to cancel the next backup job of the first service object.

In a possible implementation, the scheduling module is further configured to: when the remaining start time of the next backup job of the first service object is greater than or equal to 0, determine not to cancel the next backup job of the first service object.

In a possible implementation, the scheduling module is further configured to: when the cancellation probability of the next backup job of the first service object is less than or equal to the preset threshold, determine not to cancel the next backup job of the first service object.

In a possible implementation, the apparatus further includes: a rate limiting module, configured to: receive a transmit rate and a receive rate of a backup job of a second service object in a last periodicity that are sent by the client, where the backup job of the second service object is being executed; and obtain a rate limit of the backup job of the second service object in a next periodicity based on the transmit rate and the receive rate. The sending module is further configured to send a rate limiting indication to the client, where the rate limiting indication includes the rate limit of the backup job of the second service object in the next periodicity.

In a possible implementation, the rate limiting module is configured to: input the transmit rate and the receive rate into a third machine learning model, to obtain a receive rate of the backup job of the second service object in the next periodicity; and obtain the rate limit of the backup job of the second service object in the next periodicity based on the receive rate of the backup job of the second service object in the next periodicity.

In a possible implementation, the rate limiting module is configured to: obtain a preset bandwidth of a first port, where the first port is configured to execute the backup job of the second service object; obtain a sum of receive rates, in the next periodicity, of all backup jobs transmitted by the first port; and obtain the rate limit of the backup job of the second service object in the next periodicity based on the preset bandwidth of the first port, the receive rate of the backup job of the second service object in the next periodicity, and the sum of the receive rates.

In a possible implementation, the apparatus further includes: a training module, configured to obtain a target machine learning model through training, where the target machine learning model includes at least one of the first machine learning model, the second machine learning model, and the third machine learning model, the first machine learning model is used to predict a scheduling sequence of next backup jobs of service objects, the second machine learning model is used to predict a second backup data volume and a second job completion time of a service object, and the third machine learning model is used to predict a receive rate of a backup job of a service object in a next periodicity.

In a possible implementation, the training module is configured to: obtain historical backup data volumes and historical job completion times of the plurality of service objects, where the historical backup data volumes and the historical job completion times correspond to completed backup jobs of the plurality of service objects; obtain a preset machine learning model; input the historical backup data volumes and the historical job completion times of the plurality of service objects into the preset machine learning model, to obtain predicted backup data volumes and predicted job completion times of the plurality of service objects; and perform convergence training based on the predicted backup data volumes and the predicted job completion times to obtain the target machine learning model.

In a possible implementation, the training module is configured to: obtain historical receive rates and historical transmit rates of the completed backup jobs of the plurality of service objects; obtain a preset machine learning model; input the historical receive rates and the historical transmit rates into the preset machine learning model, to obtain predicted receive rates of backup jobs of the plurality of service objects; and perform convergence training based on the predicted receive rates to obtain the target machine learning model.

According to a third aspect, this application provides a backup system, including: one or more processors; and a memory, configured to store one or more programs. When the one or more programs are executed by the one or more processors, the one or more processors are enabled to implement the method according to any one of the possible implementations of the first aspect.

According to a fourth aspect, this application provides a computer-readable storage medium, including a computer program. When the computer program is executed on a computer, the computer is enabled to perform the method according to any one of the possible implementations of the first aspect.

According to a fifth aspect, this application provides a computer program product. The computer program product includes computer program code. When the computer program code is run on a computer, the computer is enabled to perform the method according to any one of the possible implementations of the first aspect.

DESCRIPTION OF EMBODIMENTS

Figure 1:
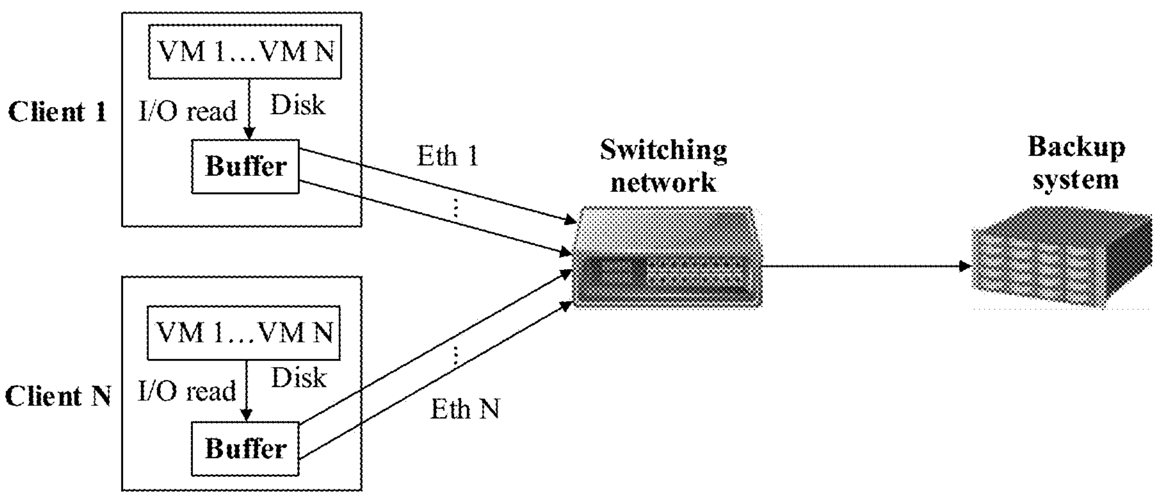
FIG. 1 is an example framework diagram of a backup system.

To make objectives, technical solutions, and advantages of this application clearer, the following clearly and completely describes the technical solutions in this application with reference to the accompanying drawings in this application. It is clear that the described embodiments are merely some rather than all of embodiments of this application. All other embodiments obtained by a person of ordinary skill in the art based on embodiments of this application without creative efforts shall fall within the protection scope of this application.

In the specification, embodiments, claims, and accompanying drawings of this application, the terms “first”, “second”, and the like are merely intended for distinguishing and description, and shall not be understood as indicating or implying relative importance, or indicating or implying a sequence. In addition, the terms “include”, “have”, and any variant thereof are intended to cover non-exclusive inclusion. For example, a process, method, system, product, or device that includes a series of steps or units is not necessarily limited to those steps or units expressly listed, but may include other steps or units not expressly listed or inherent to such a process, method, system, product, or device.

It should be understood that in this application, “at least one (item)” refers to one or more and “a plurality of” refers to two or more. The term “and/or” is used for describing an association relationship between associated objects, and represents that three relationships may exist. For example, “A and/or B” may represent the following three cases: Only A exists, only B exists, and both A and B exist, where A and B may be singular or plural. The character “/” generally indicates an “or” relationship between the associated objects. The expression “at least one of the following items (pieces)” or a similar expression means any combination of these items, including a single item (piece) or any combination of a plurality of items (pieces). For example, at least one of a, b, or c may indicate a, b, c, a and b, a and c, b and c, or a, b, and c, where a, b, and c may be singular or plural.

A backup job is that a client periodically generates duplicates for data of different service objects and transmits the duplicates to a background backup system within a predetermined time window. Backup orchestration is aimed at designing a set of efficient backup transmission resource (such as a transmission time and bandwidth) allocation and scheduling solutions to allocate limited backup resources to backup jobs waiting for transmission, so that as many backup jobs as possible can be completed within predetermined time windows, and a backup bandwidth/throughput of the entire system is maximized.

With rapid development of information technologies, an information system plays an increasingly important role in key service objects of various industries. In communication, finance, medical care, e-commerce, logistics, government, or other fields, if a service object of the information system is interrupted, a huge economic loss may be caused, a brand image may be affected, and important data may be lost. Therefore, disaster recovery centers are generally built in various industries to improve continuity of service objects of key applications, and duplicates of production data are periodically backed up in the disaster recovery centers. According to Gartner’s prediction, an annual data volume growth of each industry will exceed 50%, while a data protection budget growth is less than 10%. Therefore, with limited backup resource investment, core competitiveness of a secondary storage product is how to use a given backup system appropriately to cope with increasing backup data in a fixed and limited available backup time window of a client.

Backup data in actual production environments of the industries is complex and changeable, arrival times and read/write rates of different backup service object flows generated by a plurality of client/service object ends are highly dynamic, and backup time windows allowed for jobs are different. If backup jobs cannot be efficiently orchestrated, for service object flows of different jobs, resources may conflict in a same time or space or a resource may be unnecessarily idle. As a result, an effective bandwidth is low and a service level agreement (SLA) is affected. If only experienced operation personnel are required to manually analyze a dynamic production environment, operation efficiency and resource utilization are low, which cannot meet massive service object backup requirements of clients.

FIG. 1 is an example framework diagram of a backup system. As shown in FIG. 1, virtual machine (VM) backup is used as an example. A series of VMs (for example, a VM 1 to a VM N) are deployed on a client (for example, a client 1 and a client N) to carry different application service objects. These VM service objects periodically back up production data from the client to a background backup system at a specific backup frequency (for example, every hour, every day, every week, or every month) by using a switching network. Each VM service object may perform full backup (all data is backed up) or incremental backup (only new data relative to a last backup is backed up). A volume of backup data to be transmitted in each backup job is highly dynamic and is unknown in advance. Each backup job needs to be executed within a specified time window (for example, only in a period of time after a job is stopped and before the job starts next time). Backup data of backup jobs differs in storage media and production environments. Therefore, the backup data is highly dynamic in client read capabilities, dynamic transmission over a network, disk writing speeds of the backup system, and the like. The backup system needs to efficiently schedule and orchestrate backup jobs while meeting various time window and resource constraints, to ensure that as many backup jobs as possible can be completed within specified time windows and maximize a system backup throughput.

The entire backup process is affected by many dynamic uncertainties. A main backup job orchestration challenge of the backup system is how to make an optimal intelligent supply and demand orchestration decision under impact of many dynamic uncertainties. The dynamic uncertainties include: (1) A total data volume of a backup job is unknown in advance. (2) A rate at which the client reads backup data from a local storage medium fluctuates dynamically (as affected by a local read rate, load of a central processing unit (CPU), or the like). (3) A real-time transmission rate of the backup data is dynamically affected by a link bandwidth congestion status and back-end receiving and input/output (I/O) disk writing statuses. (4) Backup jobs are continuously dynamically completed and exit the backup system and new backup jobs enter the backup system. As a result, both load of the backup system and a real-time available remaining resource of the entire backup system dynamically fluctuate.

Existing backup job scheduling and orchestration policies include static orchestration and dynamic orchestration. The static orchestration is mainly setting a fixed job backup policy to control execution of backup jobs. The dynamic orchestration is dynamically adjusting scheduling based on a dynamic attribute of a service object. However, scheduling effects of these orchestration policies are greatly affected by manual experience of a client and random operations, which may lead to insufficient matching precision between the backup system and a dynamic characteristic of each backup job, or even cause extra interruption and resumption overheads, affecting a system throughput and SLA time window compliance of jobs.

To resolve the foregoing technical problem, this application provides a data backup method, to maximize a throughput of the entire backup system, schedule as many backup jobs as possible, and complete transmission of backup data of the backup jobs in respective SLA time windows.

For ease of understanding, the following first explains some nouns or terms used in this application. The nouns or terms are also used as a part of content of the present invention.

1. Neural Network

The neural network (NN) is a machine learning model. The neural network may include neurons. The neuron may be an operation unit that uses $x_s$ and an intercept of 1 as inputs. An output of the operation unit may be as follows:

$$h_{W,b}(x) = f(W^T x) = f\left(\sum_{s=1}^{n} W_s x_s + b\right) \tag{1-1}$$

s=1, 2, . . . , or n, n is a natural number greater than 1, $W_s$ is a weight of $x_s$, and b is bias of the neuron. f is an activation function of the neuron, and is used to introduce a non-linear characteristic into the neural network to convert an input signal in the neuron into an output signal. The output signal of the activation function may be used as an input of a next convolutional layer. The activation function may be a non-linear function such as ReLU. The neural network is a network formed by connecting many single neurons, that is, an output of a neuron may be an input of another neuron. An input of each neuron may be connected to a local receptive field of a previous layer to extract a feature of the local receptive field. The local receptive field may be a region including several neurons.

2. Multi-Layer Perceptron (MLP)

The MLP is a simple deep neural network (DNN) (different layers are fully connected), and is also referred to as a multi-layer neural network, which may be understood as a neural network with many hidden layers. There is no specific measurement criterion for "many" herein. The DNN is divided based on positions of different layers. A neural network in the DNN may be divided into three types: an input layer, a hidden layer, and an output layer. Generally, the first layer is an input layer, the last layer is an output layer, and a layer in the middle is a hidden layer. Layers are fully connected. To be specific, any neuron in an $i^{th}$ layer is definitely connected to any neuron in an $(i+1)^{th}$ layer. The DNN seems complex, but work of each layer is actually not complex, which is simply shown in the following linear relationship expression: $\vec{y}=\alpha(W\vec{x}+\vec{b})$ where $\vec{x}$ is an input vector, $\vec{y}$ is an output vector, $\vec{b}$ is a bias vector, W is a weight matrix (also referred to as a coefficient), and α( ) is an activation function. Each layer simply performs such a simple operation on an input vector $\vec{x}$ to obtain an output vector $\vec{y}$ Because the DNN has many layers, there are also many coefficients W and bias vectors $\vec{b}$. These parameters are defined in the DNN as follows: The coefficient W is used as an example. It is assumed that in a three-layer DNN, a linear coefficient from a fourth neuron at a second layer to a second neuron at a third layer is defined as $$w_{24}^{3}.$$

3 represents a layer at which the coefficient W is located, and the subscript corresponds to an output third-layer index 2 and an input second-layer index 4. In conclusion, a coefficient from a kth neuron at an $(L-1)^{th}$ layer to a $j^{th}$ neuron at an Lth layer is defined as $$W_{jk}^{L}.$$

noted that the input layer does not have the parameter W. In the deep neural network, more hidden layers make the network more capable of describing a complex case in the real world. Theoretically, a model with more parameters is more complex, and has a larger "capacity", which means that the model can complete a more complex learning job. Training of the deep neural network is a process of learning a weight matrix, and an ultimate objective of the training is to obtain a weight matrix of all layers of a trained deep neural network (a weight matrix formed by vectors W of many layers).

3. Convolutional Neural Network

The convolutional neural network (CNN) is a deep neural network with a convolutional structure, and is a deep learning architecture. In the deep learning architecture, multi-layer learning is performed at different abstract levels according to a machine learning algorithm. As a deep learning architecture, the CNN is a feed-forward artificial neural network. Neurons in the feed-forward artificial neural network may respond to an image input into the neural network. The convolutional neural network includes a feature extractor including a convolutional layer and a pooling layer. The feature extractor may be considered as a filter. A convolution process may be considered as using a trainable filter to perform convolution on an input image or a convolutional feature map.

The convolutional layer is a neuron layer performing convolution processing on an input signal in the convolutional neural network. The convolutional layer may include a plurality of convolution operators. The convolution operator is also referred to as a kernel. In image processing, the convolution operator functions as a filter that extracts specific information from an input image matrix. The convolution operator may essentially be a weight matrix, and the weight matrix is usually predefined. In a process of performing a convolution operation on an image, the weight matrix is usually used to process pixels one by one (or two by two or the like, which depends on a value of a stride) in a horizontal direction on the input image, to extract a specific feature from the image. A size of the weight matrix needs to be related to a size of the image. It should be noted that a depth dimension of the weight matrix is the same as a depth dimension of the input image. During the convolution operation, the weight matrix extends to an entire depth of the input image. Therefore, a convolutional output of a single depth dimension is generated through convolution with a single weight matrix. However, in most cases, no single weight matrix is used, but a plurality of weight matrices with a same size (rows×columns), that is, a plurality of homogeneous matrices, are used. Outputs of the weight matrices are stacked to form a depth dimension of a convolutional image. The dimension herein may be understood as being determined by the foregoing "many". Different weight matrices may be used to extract different features from the image. For example, a weight matrix is used to extract side information of the image, another weight matrix is used to extract a specific color of the image, and still another weight matrix is used to blur unwanted noise in the image. Sizes (rows×columns) of the plurality of weight matrices are the same, and sizes of feature maps obtained through extraction based on the plurality of weight matrices of the same size are also the same. Then, the plurality of extracted feature maps of the same size are combined to form an output of the convolution operation. Weight values in these weight matrices need to be obtained through lots of training in actual application. Each weight matrix formed by weight values obtained through training may be used to extract information from an input image, so that the convolutional neural network performs correct prediction. When the convolutional neural network has a plurality of convolutional layers, a large quantity of general features are usually extracted at an initial convolutional layer. The general features may also be referred to as low-level features. As a depth of the convolutional neural network increases, a feature extracted at a subsequent convolutional layer is more complex, for example, a high-level semantic feature. A feature with higher-level semantics is more applicable to a to-be-resolved problem.

A quantity of training parameters usually needs to be reduced. Therefore, a pooling layer usually needs to be periodically introduced after a convolutional layer. One convolutional layer may be followed by one pooling layer, or a plurality of convolutional layers may be followed by one or more pooling layers. During image processing, the pooling layer is used only to reduce a space size of an image. The pooling layer may include an average pooling operator and/or a maximum pooling operator for sampling an input image to obtain an image of a smaller size. The average pooling operator may calculate, within a specific range, an average value of pixel values in the image as a result of average pooling. The maximum pooling operator may obtain, within a specific range, a pixel with a maximum value within the range as a result of maximum pooling. In addition, similar to that a size of a weight matrix in a convolutional layer needs to be related to an image size, the operator in the pooling layer also needs to be related to a size of an image. A size of an image output after processing performed by the pooling layer may be less than a size of an image input into the pooling layer. Each pixel in the image output by the pooling layer represents an average value or a maximum value of a corresponding sub-region of the image input into the pooling layer.

After processing of the convolutional layer/pooling layer, the convolutional neural network is still not ready to output required output information, because the convolutional layer/pooling layer only extracts a feature and reduces parameters brought by an input image, as described above. However, to generate final output information (required class information or other related information), the convolutional neural network needs to use the neural network layer to generate a quantity of outputs of one or a set of required classes. Therefore, the convolutional neural network layer may include a plurality of hidden layers. Parameters included in the plurality of hidden layers may be obtained through pre-training based on related training data of a specific job type. For example, the job type may include image recognition, image classification, or super-resolution image reconstruction.

Optionally, in the neural network layer, the plurality of hidden layers are followed by an output layer of the entire convolutional neural network. The output layer has a loss function similar to a categorical cross entropy, and is used to calculate a prediction error. Once forward propagation of the entire convolutional neural network is completed, back propagation is started to update a weight value and a deviation of each layer mentioned above, to reduce a loss of the convolutional neural network and an error between a result output by the convolutional neural network by using the output layer and an ideal result.

4. Recurrent Neural Network

The recurrent neural network (RNN) is used to process sequence data. In a conventional neural network model, layers from an input layer to a hidden layer and then to an output layer are fully connected, while nodes in each layer are not connected. Such a common neural network resolves many problems, but is still incapable of resolving many other problems. For example, to predict a next word in a sentence, a previous word usually needs to be used, because the previous word and the next word in the sentence are not independent. A reason why the RNN is referred to as the recurrent neural network is that a current output for a sequence is related to a previous output for the sequence. A specific representation form is that the network memorizes previous information and applies the previous information to calculation of the current output. To be specific, nodes in the hidden layer are connected rather than unconnected, and an input of the hidden layer not only includes an output of the input layer, but also includes an output of the hidden layer at a previous moment. Theoretically, the RNN can process sequence data of any length. Training of the RNN is the same as training of a conventional CNN or DNN. Similarly, an error back propagation algorithm is used. However, there is such a difference that if the RNN is expanded, a parameter such as W of the RNN is shared. This is different from the conventional neural network described in the foregoing example. In addition, during use of a gradient descent algorithm, an output of each step depends not only on a network in a current step, but also on a network status in several previous steps. The learning algorithm is referred to as a back propagation through time (BPTT) algorithm.

Why is the recurrent neural network still required when the convolutional neural network is available? A reason is simple. In the convolutional neural network, there is a premise that elements are independent of each other, and an input and an output are also independent, such as a cat and a dog. However, in the real world, many elements are interconnected. For example, stocks change over time. For another example, a person says "I like traveling, and my most favorite place is Yunnan. In the future, I will go there when there is a chance". Herein, humans know that the person will go to "Yunnan", because they may perform inference from the context. However, how do machines do that? Then, the RNN emerges. The RNN is intended to make a machine capable of memorizing like a human. Therefore, an output of the RNN needs to depend on current input information and historical memorized information.

5. Loss Function

In a process of training a deep neural network, because it is expected that an output of the deep neural network is as close as possible to a value that is actually expected to be predicted, a predicted value of a current network may be compared with a target value that is actually expected, and then a weight vector of each layer of the neural network is updated based on a difference between the two (certainly, an initialization process is usually performed before the first update, that is, a parameter is preconfigured for each layer in the deep neural network). For example, if the predicted value of the network is higher, the weight vector is adjusted to obtain a lower predicted value. The weight vector is continuously adjusted until the deep neural network can predict the target value that is actually expected or a value that is quite close to the target value that is actually expected. Therefore, "how to compare the predicted value with the target value to obtain the difference" needs to be predefined. This leads to a loss function or an objective function. The loss function and the objective function are important equations for measuring the difference between the predicted value and the target value. The loss function is used as an example. A higher output value (loss) of the loss function indicates a larger difference. In this case, training of the deep neural network is a process of minimizing the loss.

6. Back Propagation Algorithm

For the convolutional neural network, an error back propagation (BP) algorithm may be used to correct a value of a parameter in an initial super-resolution model in a training process, so that a reconstruction error loss of the super-resolution model becomes smaller. Specifically, an input signal is transferred forward until an error loss occurs in an output, and the parameter in the initial super-resolution model is updated based on back propagation error loss information, so that the error loss converges. The back propagation algorithm is an error-loss-centered back propagation motion intended to obtain an optimal parameter, such as a weight matrix, of the super-resolution model.

7. Generative Adversarial Network

The generative adversarial network (GAN) is a deep learning model. The model includes at least two modules: one module is a generative model, and the other module is a discriminative model. The two modules perform gaming with each other and learn to generate a better output. Both the generative model and the discriminative model may be neural networks, and may be deep neural networks or convolutional neural networks. A basic principle of the GAN is as follows: Using a GAN for generating a picture as an example, it is assumed that there are two networks: G (Generator) and D(Discriminator). G is a network for generating a picture. G receives random noise z, and uses the noise to generate a picture, denoted as G(z). D is a discriminator network for determining whether a picture is "real". An input parameter of D is x, x represents a picture, and an output D(x) represents a probability that x is a real picture. If a value of D(x) is 1, it indicates that the picture is 130% real. If the value of D(x) is 0, it indicates that the picture cannot be real. In a process of training the generative adversarial network, an objective of the generative network G is to generate a picture that is as real as possible to deceive the discriminative network D, while an objective of the discriminative network D is to distinguish the picture generated by G from a real picture as far as possible. In this way, a dynamic "gaming" process, that is, "adversarial" in the "generative adversarial network", occurs between G and D. A final gaming result is that in an ideal state, G may generate a "just-like-real" picture G(z), and it is difficult for D to determine whether the picture generated by G is real, that is, D(G(z))=0.5. In this way, an excellent generative model G is obtained, and may be used to generate a picture.

Figure 2:
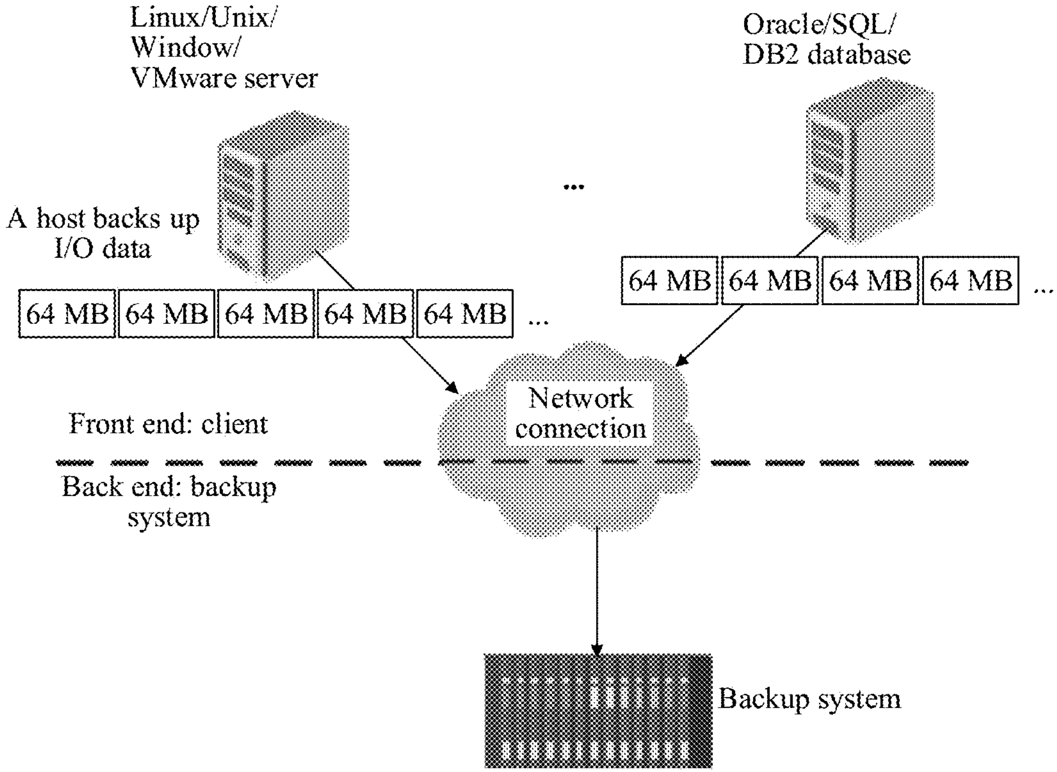
FIG. 2 is an example structural diagram of a system architecture according to embodiments of this application.

FIG. 2 is an example structural diagram of a system architecture according to this application. As shown in FIG. 2, the system may be used to schedule and orchestrate data backup jobs in various different scenarios, including VM, database, file, and other backup scenarios. This is not specifically limited herein.

The system is divided into two parts: a front end (client) and a back end (backup system). The front-end client and the back-end backup system are connected by using a network. The network connection includes but is not limited to Ethernet, Internet protocol (IP), or other direct connection or multi-hop networking connection, and uses transmission control protocol (TCP), remote direct memory access (RDMA), or other data transmission forms. It should be noted that the network connection in this application may alternatively use another connection manner or another data transmission form. This is not specifically limited herein.

The front-end client may include servers that support various operating systems (for example, Windows, Unix, Linux, and VMware), or various databases (for example, Oracle, SQL, and DB2). In addition, the client may further include other service objects that have a data backup requirement. This is not specifically limited in this application.

The back-end backup system may uniformly schedule and orchestrate backup jobs under different SLA constraints. Under existing CPU and network transmission resource constraints, the back-end backup system performs scheduling ranking and transmission rate control on backup jobs waiting for transmission, to optimize a system throughput and SLA time window compliance of each backup job.

It should be noted that FIG. 2 shows an example of the system architecture in this application, but the system architecture does not constitute a limitation. Both quantities, implementation forms, implementation functions, and the like of front-end clients in the system, and a construction manner, a deployment policy, and the like of the back-end backup system may be implemented by using other solutions. This is not specifically limited herein.

Based on the foregoing system architecture, the following describes the data backup method provided in this application.

Figure 3:
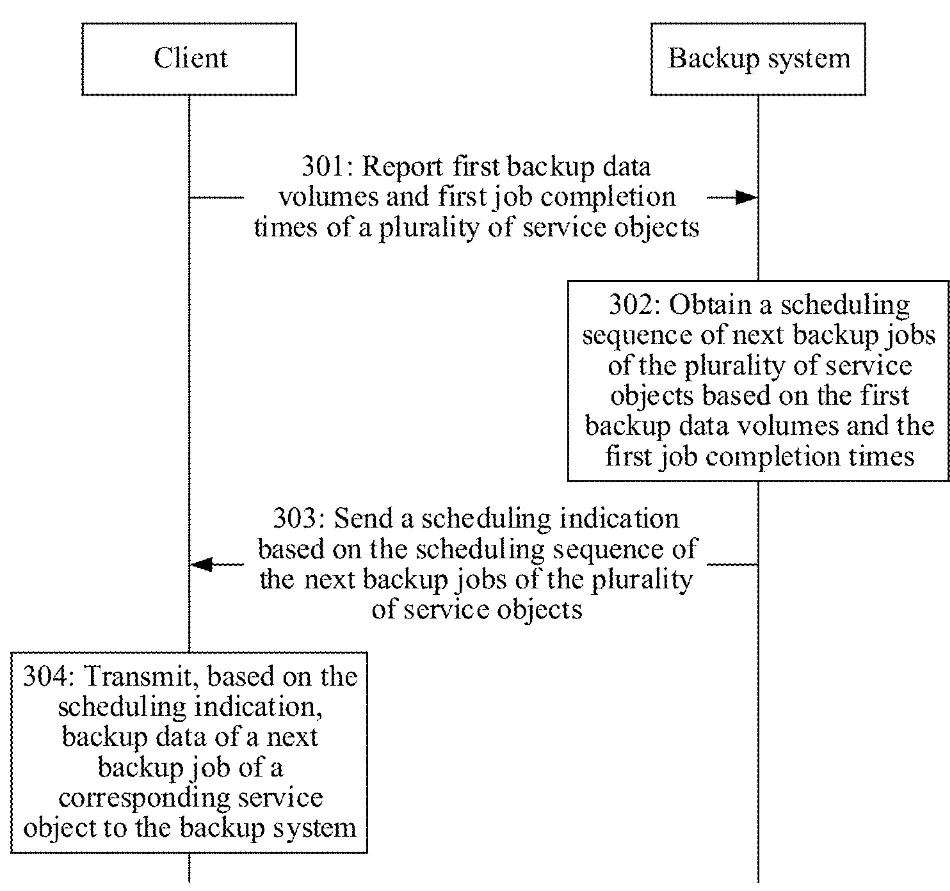
FIG. 3 is a flowchart of a process 300 of a data backup method according to an embodiment of this application.

FIG. 3 is a flowchart of a process 300 of a data backup method according to an embodiment of this application. The process 300 may be performed jointly by a front-end client and a back-end backup system. The process 300 is described as a series of steps or operations. It should be understood that the steps or operations of the process 300 may be executed in various sequences and/or simultaneously, and are not limited to an execution sequence shown in FIG. 3. The process 300 includes the following steps.

Step 301: The client reports first backup data volumes and first job completion times of a plurality of service objects to the backup system.

The plurality of service objects of the client may include service objects of servers that support various operating systems (for example, Windows, Unix, Linux, and VMware), service objects of various databases (for example, Oracle, SQL, and DB2), and service objects of other devices or services that have a data backup requirement. This is not specifically limited in this embodiment of this application. It should be understood that one client may include a plurality of service objects. For example, a plurality of VMs are created on a server, and one VM is one service object. For another example, database services for a plurality of users are created in a database, and one database service is one service object.

The first backup data volumes and the first job completion times correspond to the last backup jobs of the plurality of service objects. The data backup requirement of the service object is a long-term and periodically repeated process. For example, a service object periodically backs up production data from a client to a background backup system at a specific backup frequency (for example, every hour, every day, every week, or every month) by using a switching network. Therefore, the service object may consider each data transmission process as a backup job. The backup job of the service object is periodically started and executed. Based on this, in this embodiment of this application, a backup job that is to be executed in a next periodicity is referred to as a next backup job of the service object, and a backup job that has been executed in a last periodicity before the backup job that is to be executed in the next periodicity is referred to as a last backup job of the service object.

After all backup data of a service object is transmitted, that is, after a last backup job of the service object is completed, the client may report a backup data volume and a job completion time (JCT) of the backup job to the backup system. In this way, after a period of time, for example, by the end of each day or each month, the backup system may obtain backup data volumes and job completion times (that is, the first backup data volumes and the first job completion times) of last backup jobs of a plurality of service objects.

Step 302: The backup system obtains a scheduling sequence of next backup jobs of the plurality of service objects based on the first backup data volumes and the first job completion times.

In this embodiment of this application, the backup system may obtain the scheduling sequence of the next backup jobs of the plurality of service objects by using the following two methods:

1. The first backup data volumes and the first job completion times are input into a first machine learning model, to obtain the scheduling sequence of the next backup jobs of the plurality of service objects.

The first machine learning model may be obtained through pre-training. For a training process of the first machine learning model, refer to the following embodiment. An input of the first machine learning model is the first backup data volumes and the first job completion times of the plurality of service objects, and an output is the scheduling sequence of the next backup jobs of the plurality of service objects. For example, the service objects include a VM 1, a VM 2, and a VM 3. First backup data volumes and first job completion times of the three service objects are input into the first machine learning model. The first machine learning model performs prediction and outputs a scheduling sequence of next backup jobs of the three service objects: the VM 3→the VM 2→the VM 1. It should be noted that the scheduling sequence may be represented by an arrangement sequence of identifiers (for example, VM IDs) of the service objects, or may be represented by an arrangement sequence of indexes (for example, Job IDs) of the backup jobs of the service objects. A manner of representing the scheduling sequence is not specifically limited in this embodiment of this application.

2. The first backup data volumes and the first job completion times are input into a second machine learning model, to obtain second backup data volumes and second job completion times of the plurality of service objects. The second backup data volumes and the second job completion times correspond to the next backup jobs of the plurality of service objects. The scheduling sequence of the next backup jobs of the plurality of service objects is obtained based on the second backup data volumes and the second job completion times.

The second machine learning model may also be obtained through pre-training. For a training process of the second machine learning model, also refer to the following embodiment. An input of the second machine learning model is the first backup data volumes and the first job completion times of the plurality of service objects, and an output is the second backup data volumes and the second job completion times of the plurality of service objects. The second backup data volumes and the second job completion times are backup data volumes and job completion times that are of the next backup jobs of the service objects and that are predicted by the second machine learning model. Because the next backup jobs have not been executed, the second backup data volumes and the second job completion times are not actual values, but predicted values.

After obtaining the second backup data volumes and the second job completion times of the plurality of service objects, for any one (for example, a first service object) of the plurality of service objects, the backup system may calculate a ratio of a second backup data volume corresponding to the first service object to a second job completion time corresponding to the first service object, to obtain an easiness degree of a next backup job of the first service object. In other words, the backup system needs to calculate an easiness degree of a next backup job of each of the plurality of service objects. The easiness degree is a ratio of a second backup data volume to a second job completion time. A larger ratio indicates that the next backup job is easier, and a smaller ratio indicates that the next backup job is more difficult.

Then, a remaining start time of the next backup job of the first service object is obtained based on the second job completion time corresponding to the first service object.

The backup system may calculate a difference of a latest job end time MaxEndTime (the information is reported to the backup system when the service object is registered or reconfigured) from the second job completion time and a current time t, to obtain the remaining start time of the next backup job.

After easiness degrees of the next backup jobs of the plurality of service objects and remaining start times of the next backup jobs of the plurality of service objects are all obtained, the scheduling sequence of the next backup jobs of the plurality of service objects is obtained based on the easiness degrees of the next backup jobs of the plurality of service objects and the remaining start times of the next backup jobs of the plurality of service objects.

For the first service object, after obtaining the easiness degree of the next backup job of the first service object and the remaining start time of the next backup job of the first service object, the backup system may calculate a ratio of the easiness degree of the next backup job of the first service object to the remaining start times of the next backup jobs of the plurality of service objects, to obtain a scheduling threshold of the next backup job of the first service object. The backup system may obtain scheduling thresholds of the next backup jobs of all the service objects by using the same calculation method. A larger scheduling threshold indicates that the next backup job is easy to complete and urgent, and needs to be started as soon as possible. A smaller scheduling threshold indicates that the next backup job is more difficult to complete and not urgent, and may be postponed. Then, the thresholds of the next backup jobs of the plurality of service objects are ranked in descending order, to obtain the scheduling sequence of the next backup jobs of the plurality of service objects.

Two machine learning models are used in the foregoing two methods, and a difference lies in that outputs of the machine learning models are different. This is related to training processes of the machine learning models. In addition, the machine learning models may further output other information, to assist in obtaining the scheduling sequence of the next backup jobs of the plurality of service objects. Therefore, the outputs of the machine learning models are not limited in this embodiment of this application. Regardless of which machine learning model is used, a system throughput and SLA time window compliance of the jobs are fully considered during training. Matching precision between the backup system and a dynamic characteristic of each backup job is trained in combination with the dynamic characteristic of the backup job (for example, a backup data volume, a job completion time, an earliest job start time, and a latest job end time of the backup job), so that a prediction result of the machine learning model is closer to an actual execution result.

In this embodiment of this application, the scheduling sequence of the next backup jobs of the plurality of service objects may alternatively be obtained by using other methods than the foregoing two methods. This is not specifically limited, either.

In a possible implementation, the backup system may first determine whether to cancel the next backup job of the first service object; and when the next backup job of the first service object is not canceled, obtain the scheduling sequence of the next backup jobs of the plurality of service objects based on the easiness degrees of the next backup jobs of the plurality of service objects and the remaining start times of the next backup jobs of the plurality of service objects.

In this embodiment of this application, the backup system may determine whether the remaining start time of the next backup job of the first service object is less than 0. When the remaining start time of the next backup job of the first service object is less than 0 (indicating that a latest end time of the next backup job of the first service object has passed), a cancellation probability of the next backup job of the first service object is calculated (for example, 1-p is calculated, where p is a preset probability value, a larger value of 1-p indicates the next backup job of the first service object has a higher cancellation probability and is more likely to be canceled, and a smaller value of 1-p indicates the next backup job of the first service object has a smaller cancellation probability and is less likely to be canceled). When the cancellation probability of the next backup job of the first service object is greater than a preset threshold, it is determined to cancel the next backup job of the first service object. When the cancellation probability of the next backup job of the first service object is less than or equal to the preset threshold, it is determined not to cancel the next backup job of the first service object. When the remaining start time of the next backup job of the first service object is greater than or equal to 0 (indicating that the latest end time of the next backup job of the first service object has not arrived), it is determined not to cancel the next backup job of the first service object.

In this way, scheduling may be performed only for a next backup job of a service object that is not canceled, thereby avoiding unnecessary scheduling caused by scheduling a next backup job of a service object that needs to be canceled, and improving scheduling efficiency of the next backup jobs of the plurality of service objects.

Step 303: The backup system sends a scheduling indication to the client based on the scheduling sequence of the next backup jobs of the plurality of service objects.

After obtaining the scheduling sequence of the next backup jobs of the plurality of service objects, the backup system may sequentially select, from a scheduling queue based on a quantity of real-time available parallel threads and the scheduling sequence, a backup job at a queue head as a backup job that is to be scheduled, and send a scheduling indication to the client. The scheduling indication includes an identifier of the backup job that is to be scheduled. For example, if the quantity of real-time available parallel threads is 2, two backup jobs can be scheduled currently. Therefore, the backup system selects two backup jobs (for example, Job Ids are 1 and 2) from the queue head of the scheduling queue, and sends a scheduling indication including the Job Id 1 and the Job Id 2 to the client.

Step 304: The client transmits, based on the scheduling indication, backup data of a next backup job of a corresponding service object to the backup system.

After receiving the scheduling indication of the backup system, the client may start, based on an identifier of a service object in the scheduling indication, a next backup job of the corresponding service object, that is, transmit, to the backup system, backup data of the next backup job of the service object indicated by the identifier of the service object.

Optionally, after the next backup jobs of the plurality of service objects are completed, the client returns to step 301 to report backup data volumes and job completion times of the backup jobs of the plurality of service objects to the backup system. Each time a backup job of a service object is completed, the client may choose to send a backup data volume and a job completion time of the backup job. Alternatively, the client may choose to send the backup data volumes and the job completion times of the backup jobs of the plurality of service objects at a time after the backup jobs of the plurality of service objects are completed. This is not specifically limited herein.

In this embodiment of this application, the scheduling sequence of the next backup jobs of the plurality of service objects is obtained through prediction based on the backup data volumes and the job completion times of the last backup jobs of the plurality of service objects by using a machine learning model, so that matching precision between a backup system and a dynamic characteristic of each backup job can be fully considered, manual intervention in scheduling of the plurality of backup jobs can be avoided, and SLA time window compliance of the jobs can be improved.

Figure 4:
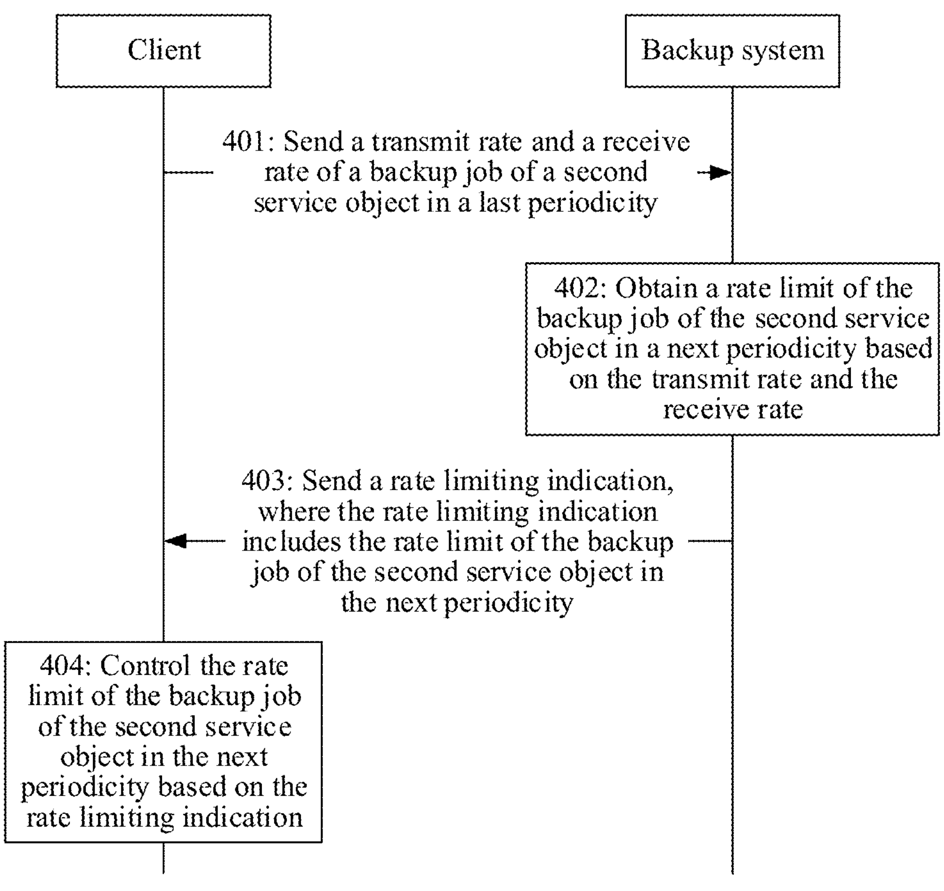
FIG. 4 is a flowchart of a process 400 of a data backup method according to an embodiment of this application.

FIG. 4 is a flowchart of a process 400 of a data backup method according to an embodiment of this application. The process 400 may be performed jointly by a front-end client and a back-end backup system. The process 400 is described as a series of steps or operations. It should be understood that the process 400 may be executed in various sequences and/or simultaneously, and is not limited to an execution sequence shown in FIG. 4. The process 400 includes the following steps.

Step 401: The client sends a transmit rate and a receive rate of a backup job of a second service object in a last periodicity to the backup system.

The backup job of the second service object is being executed. Therefore, in this embodiment of this application, rate limiting may be performed for a backup job that is being executed (the client is sending backup data of the backup job to the backup system), so that a port bandwidth resource can be used best based on a real-time transmission characteristic of the job, thereby improving a system throughput.

As described above, the backup job of the service object is periodically executed. The backup job being executed may be considered as being in a current periodicity (which may also be referred to as a next periodicity), and in this case, a periodicity in which the backup job is executed last time may be considered as a last periodicity of the backup job.

Generally, a transmit rate and a receive rate of a backup job in a periodicity change dynamically. Therefore, in this embodiment of this application, a rate reporting periodicity may be set, and the client reports, to the backup system based on the reporting periodicity, the transmit rate and the receive rate of the backup job of the second service object in the last reporting periodicity. The transmit rate and the receive rate are considered as an average transmit rate and an average receive rate in the last reporting periodicity, or may be considered as a weighted average transmit rate and a weighted average receive rate in the last reporting periodicity. This is not specifically limited herein.

Step 402: The backup system obtains a rate limit of the backup job of the second service object in a next periodicity based on the transmit rate and the receive rate.

The backup system may input the transmit rate and the receive rate into a third machine learning model, to obtain a receive rate of the backup job of the second service object in the next periodicity; and then obtain the rate limit of the backup job of the second service object in the next periodicity based on the receive rate of the backup job of the second service object in the next periodicity.

The backup system may obtain a preset bandwidth of a first port, where the first port is configured to execute the backup job of the second service object; obtain a sum of receive rates, in the next periodicity, of all backup jobs transmitted by the first port; and obtain the rate limit of the backup job of the second service object in the next periodicity based on the preset bandwidth of the first port, the receive rate of the backup job of the second service object in the next periodicity, and the sum of the receive rates. This is represented in the following formula:

$$\text{Rate limit of a backup job } i = \frac{\text{Preset bandwidth of the first port} \times \text{Predicted receive rate of the backup job } i}{\text{Sum of the predicted receive rates of all the backup jobs transmitted by the first port}}$$

The predicted receive rate of the backup job i is the receive rate of the backup job of the second service object in the next periodicity, and the sum of the predicted receive rates of all the backup jobs transmitted by the first port is the sum of the receive rates of all the backup jobs transmitted by the first port in the next periodicity.

It should be noted that, in this embodiment of this application, the rate limit of the backup job of the second service object in the next periodicity may alternatively be calculated by using other methods. This is not specifically limited herein.

Step 403: The backup system sends a rate limiting indication to the client, where the rate limiting indication includes the rate limit of the backup job of the second service object in the next periodicity.

The backup system sends the rate limit of the backup job of the second service object in the next periodicity to the client by using the rate limiting indication, so that the client may limit a transmit rate of backup data of the backup job of the second service object based on the rate limit.

Step 404: The client controls the rate limit of the backup job of the second service object in the next periodicity based on the rate limiting indication.

The client may limit the transmit rate of the backup data of the backup job of the second service object based on the rate limit, so that a port bandwidth resource can be used best based on a real-time transmission characteristic of the job, thereby improving a system throughput.

In this embodiment of this application, rate limits of the backup jobs of the plurality of service objects in the next periodicity are predicted based on transmit rates and receive rates of the backup jobs of the plurality of service objects in the last periodicity by using a machine learning model, so that a port bandwidth resource can be used best based on real-time transmission characteristics of the jobs, thereby improving a system throughput, avoiding manual intervention in scheduling of the plurality of backup jobs, and improving system transmission efficiency.

Figure 5:
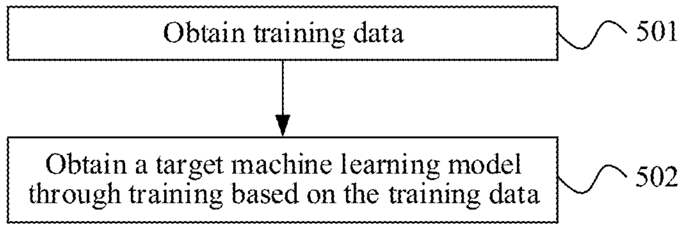
FIG. 5 is a flowchart of a process 500 of a data backup method according to an embodiment of this application.

FIG. 5 is a flowchart of a process 500 of a data backup method according to an embodiment of this application. The process 500 may be performed by a back-end backup system. The process 500 is described as a series of steps or operations. It should be understood that the process 500 may be executed in various sequences and/or simultaneously, and is not limited to an execution sequence shown in FIG. 5. The process 500 includes the following steps.

Step 501: Obtain training data.

The training data is data used to train a machine learning model, and the training data may vary with different structures, parameters, functions, and the like of the machine learning model.

Step 502: Obtain a target machine learning model through training based on the training data.

In this embodiment of this application, the target machine learning model includes at least one of a first machine learning model, a second machine learning model, and a third machine learning model, the first machine learning model is used to predict a scheduling sequence of next backup jobs of service objects, the second machine learning model is used to predict a second backup data volume and a second job completion time of a service object, and the third machine learning model is used to predict a receive rate of a backup job of a service object in a next periodicity.

Optionally, the backup system may obtain historical backup data volumes and historical job completion times of a plurality of service objects, where the historical backup data volumes and the historical job completion times correspond to completed backup jobs of the plurality of service objects; obtain a preset machine learning model; input the historical backup data volumes and the historical job completion times of the plurality of service objects into the preset machine learning model, to obtain predicted backup data volumes and predicted job completion times of the plurality of service objects; and perform convergence training based on the predicted backup data volumes and the predicted job completion times to obtain the target machine learning model.

Optionally, the backup system may obtain historical receive rates and historical transmit rates of the completed backup jobs of the plurality of service objects; obtain a preset machine learning model; input the historical receive rates and the historical transmit rates into the preset machine learning model, to obtain predicted receive rates of backup jobs of the plurality of service objects; and perform convergence training based on the predicted receive rates to obtain the target machine learning model.

The foregoing two training methods mainly differ in training data. Optionally, the methods may also differ in preset machine learning models, including different structures, parameters, and the like of the preset machine learning models. This is not specifically limited in this embodiment of this application.

In a process of training the machine learning model, because it is expected that an output of the machine learning model is as close as possible to a value that is actually expected to be predicted, a predicted value of a current network may be compared with a target value that is actually expected, and then a weight vector of each layer of the machine learning model is updated based on a difference between the two (certainly, an initialization process is usually performed before the first update, that is, a parameter is preconfigured for each layer in the machine learning model). For example, if the predicted value of the network is higher, the weight vector is adjusted to obtain a lower predicted value. The weight vector is continuously adjusted until the deep machine learning model can predict the target value that is actually expected or a value that is quite close to the target value that is actually expected. Therefore, "how to compare the predicted value with the target value to obtain the difference" needs to be predefined. This leads to a loss function or an objective function. The loss function and the objective function are important equations for measuring the difference between the predicted value and the target value. The loss function is used as an example. A higher output value (loss) of the loss function indicates a larger difference. In this case, training of the machine learning model is a process of minimizing the loss.

For the machine learning model, an error back propagation (BP) algorithm may be further used to correct a value of a parameter in an initial model in the training process, so that a reconstruction error loss of the model becomes smaller. Specifically, an input signal is transferred forward until an error loss occurs in an output, and the parameter in the initial model is updated based on back propagation error loss information, so that the error loss converges. The back propagation algorithm is an error-loss-centered back propagation motion, intended to obtain an optimal parameter, such as a weight matrix, of the machine learning model.

The technical solutions in the foregoing method embodiments are described below in detail by using several specific embodiments. It should be noted that the following embodiments are merely used as possible implementations to describe the technical solutions of this application, and do not constitute limitations on the solutions of this application.

Based on functions implemented by the backup system, the backup system may be further divided into three modules: a scheduling ranking module, a rate limiting decision module, and a machine learning model training module. The machine learning model training module is responsible for periodically training and updating machine learning models based on historical data, and pushing latest machine learning models or model parameters obtained through training to the scheduling ranking module and the rate limiting decision module. The scheduling ranking module is responsible for invoking a machine learning model by using execution results of last backup jobs as an input, to output a scheduling sequence of to-be-scheduled backup jobs, and indicating, based on the scheduling sequence, the client to execute a corresponding backup job. The rate limiting decision module is responsible for invoking a machine learning model for each started backup job by using a transmit rate and a receive rate that are fed back in real time as an input, to output a dynamic rate limit of the job, and sending the rate limit to the client.

Figure 6:
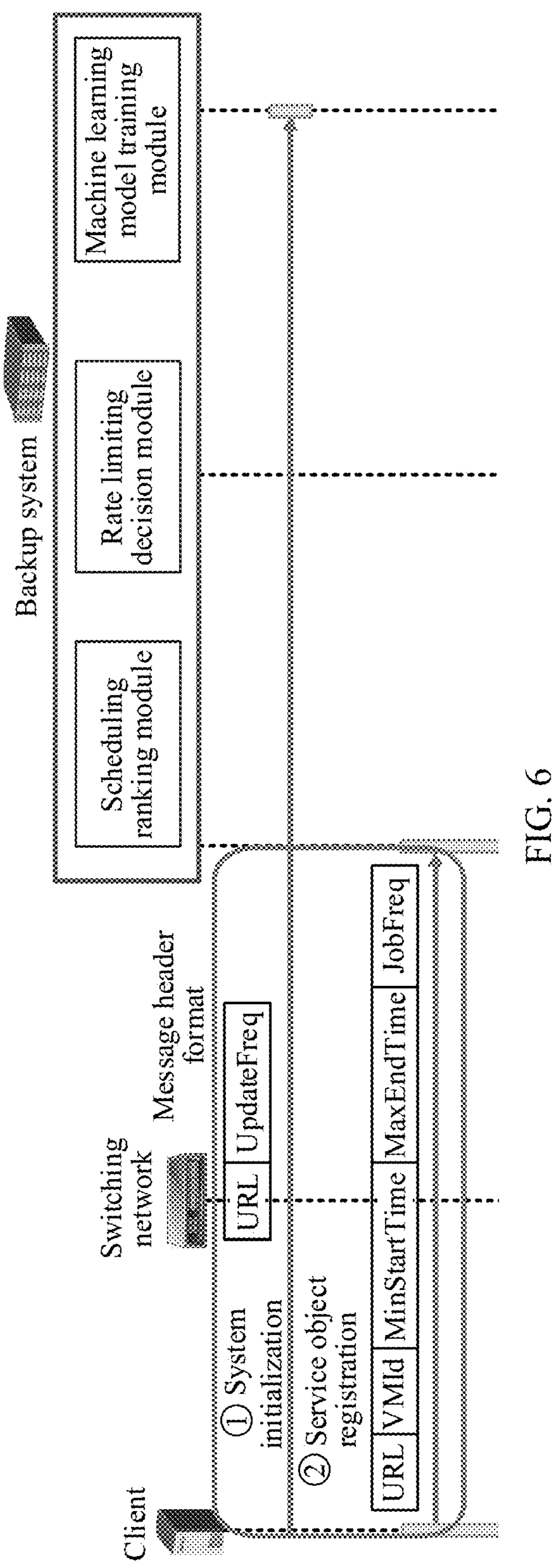
FIG. 6 is an example diagram of a client configuration and registration procedure according to an embodiment of this application.

FIG. 6 is an example diagram of a client configuration and registration procedure. As shown in FIG. 6, the client configuration and registration procedure includes two steps: 1① During system initialization (for example, in a case of a service object change, a configuration change, or system power-on), the client sends a model update frequency UpdateFreq, to configure a model training periodicity of the machine learning model training module. 2② The client sends basic configuration information of each service object (for example, a VM) to the scheduling ranking module. The information includes a service object identifier (VM Id), an earliest job start time (MinStartTime), a latest job end time (MaxEndTime), and a backup job scheduling periodicity (JobFreq).

In this application, the client is required to configure only the backup job scheduling periodicity JobFreq, the earliest job start time MinStartTime (for example, 8:00 PM after work), and the latest job end time MaxEndTime (for example, 8 am before work on the next day). The scheduling ranking module flexibly schedules a backup job within the backup job scheduling periodicity based on an actual execution status of each backup job, and optimizes an overall scheduling and orchestration policy so that as many backup jobs as possible are completed within constrained maximum allowed time windows [MinStartTime, MaxEndTime].

Optionally, in this application, the basic configuration information in step 2② may alternatively not include the earliest job start time MinStartTime and the latest job end time MaxEndTime, that is, for a backup job identified by the VM Id, a maximum allowed time window for executing the backup job is not limited. In this way, the scheduling ranking module may select a most appropriate period of time in a current periodicity (for example, one day, one week, or 12 hours) to schedule the backup job.

Figure 7:
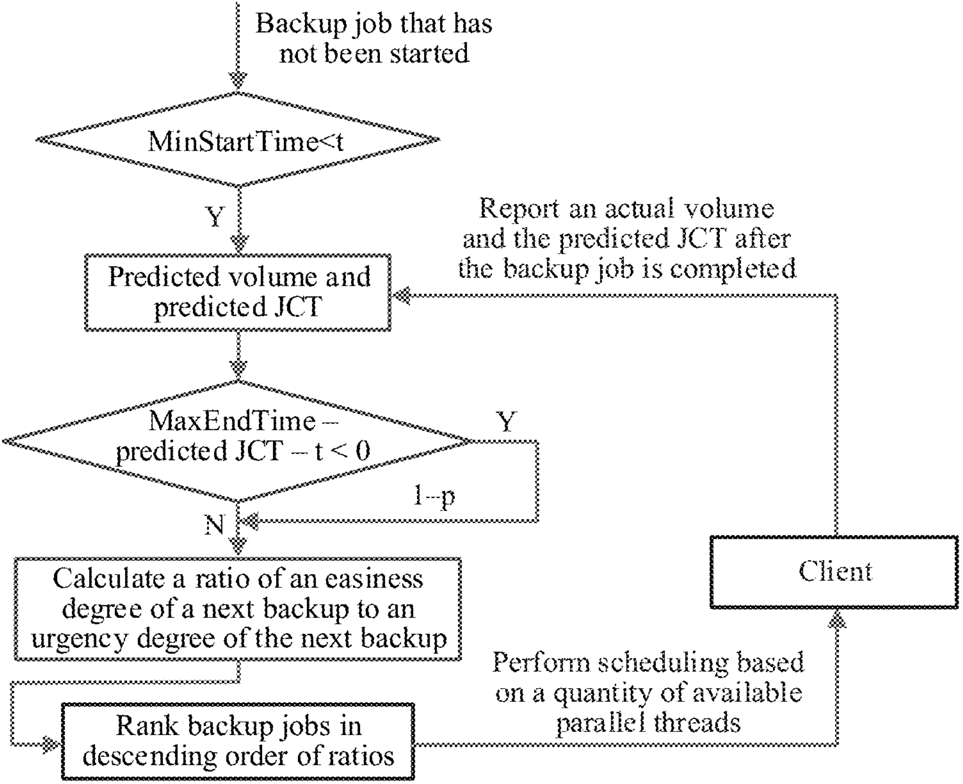
FIG. 7 is an example diagram of a scheduling ranking calculation procedure according to an embodiment of this application.

FIG. 7 is an example diagram of a scheduling ranking calculation procedure. As shown in FIG. 7, for a backup job that has not been started, the scheduling ranking module first obtains MinStartTime of the backup job, and determines whether MinStartTime<t is true, where t represents a current time. For example, the current time is 9:00 PM. If the inequality is true, it indicates that an earliest job start time specified for the backup job is earlier than the current time, and the backup job may be started. If the inequality is not true, it indicates that the earliest job start time specified for the backup job is later than the current time, that is, a start time of the backup job has not arrived, and the backup job may not be started.

When MinStartTime't is true, the scheduling ranking module predicts, by using the machine learning model obtained through training, a backup data volume and a job completion time predicted JCT of a next backup of the backup job, calculates a ratio of volume//predicted JCT as an easiness degree of the next backup of the backup job, and then calculates a result of MaxEndTime−predicted JCT−t as a remaining start time of the next backup of the backup job, which may be used as an urgency degree of the next backup of the backup job.

It is determined whether MaxEndTime−predicted JCT−t<0 is true. If the inequality is not true, it indicates that the remaining start time of the next backup of the backup job is a positive number, that is, there is still some time to the next backup of the backup job, or in other words, the current time plus the predicted job completion time of the next backup of the backup job does not reach a latest end time of the backup job. In this case, the backup job may be scheduled. If the inequality is true, it indicates that the remaining start time of the next backup of the backup job is a negative number, that is, the next backup of the backup job misses a start time, or in other words, the current time plus the predicted job completion time of the next backup of the backup job has passed the latest end time of the backup job. In this case, the next backup of the backup job is canceled at a probability of 1-p. The probability p may be preconfigured during system initialization, a larger value of p indicates a lower probability that the next backup of the backup job is canceled, and a smaller value of p indicates a higher probability that the next backup of the backup job is canceled.

Provided that the backup job is not canceled, a ratio of the easiness degree of the next backup of the backup job to the urgency degree of the next backup of the backup job is calculated, that is, $$\frac{\frac{\text{volume}}{\text{predicted } JCT}}{MaxEndTime - \text{predicted } JCT - t}$$

is calculated.

After ratios of all to-be-scheduled backup jobs are obtained, the backup jobs may be ranked in descending order of the ratios of the backup jobs, to obtain a scheduling queue of next backups of all the to-be-scheduled backup jobs. For example, at a same easiness degree, a larger value (indicating that a backup job is not urgent) of the urgency degree indicates a smaller ratio obtained through calculation and a lower scheduling ranking of the backup job, and a smaller value (indicating that the backup job is urgent) of the urgency degree indicates a larger ratio obtained through calculation and a higher scheduling ranking of the backup job. For another example, at a same urgency degree, a larger value (indicating that it is easy to complete the backup job) of the easiness degree indicates a larger ratio obtained through calculation and a higher scheduling ranking of the backup job, and a smaller value (indicating that it is complex to complete the backup job) of the easiness degree indicates a smaller ratio obtained through calculation and a lower scheduling ranking of the backup job.

Figure 8:
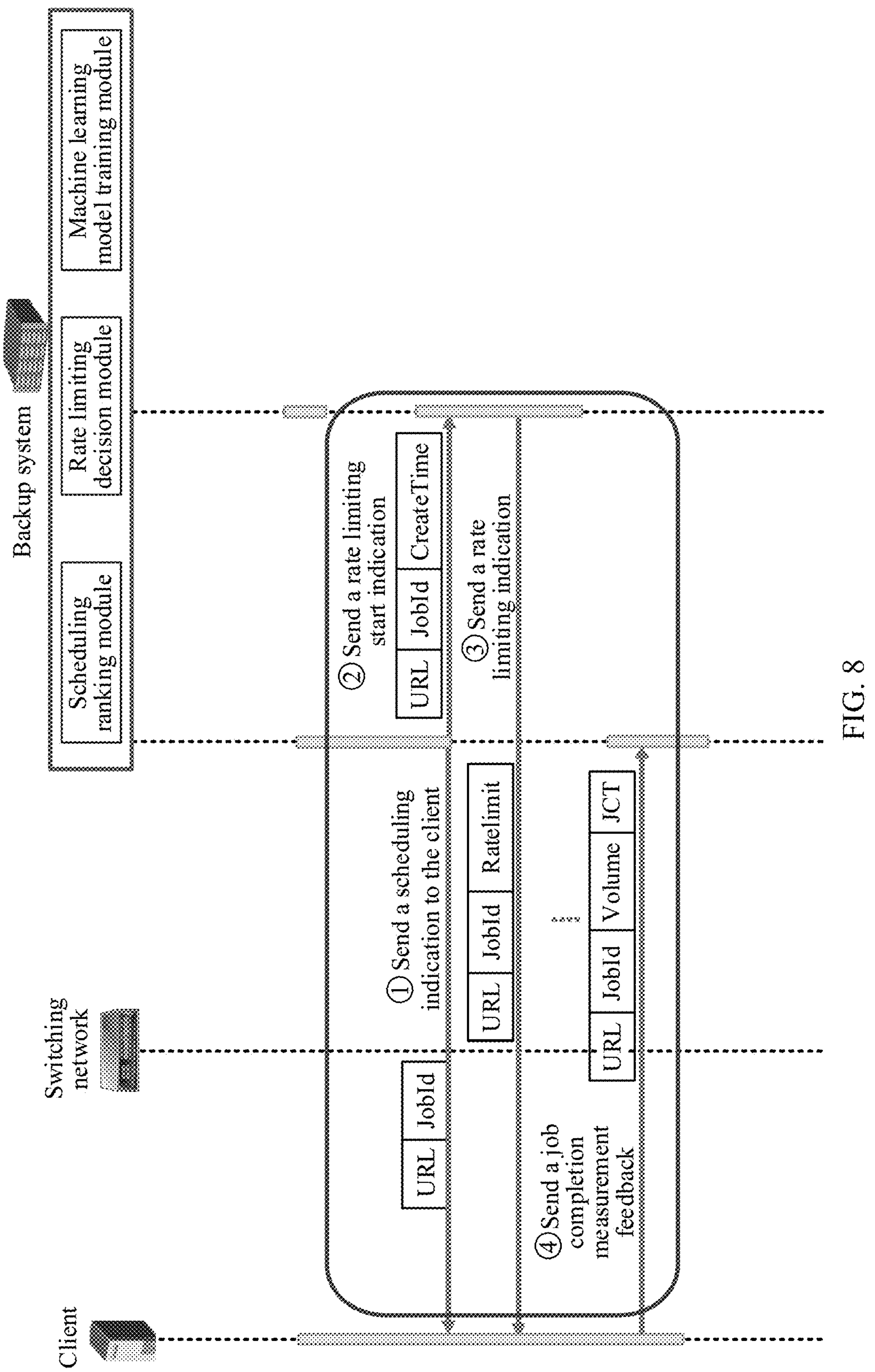
FIG. 8 is an example diagram of a real-time scheduling interaction procedure according to an embodiment of this application.

FIG. 8 is an example diagram of a real-time scheduling interaction procedure. As shown in FIG. 8, the scheduling ranking module obtains a scheduling sequence of next backups of a plurality of to-be-scheduled backup jobs by using the method shown in FIG. 7.

Based on this, the scheduling ranking module sequentially selects, from a scheduling queue based on a quantity of real-time available parallel threads and the scheduling sequence, a backup job at a queue head as a backup job that is to be scheduled, and sends a scheduling indication to the client, where the scheduling indication includes an identifier (Job Id) of the backup job that is to be scheduled, so that the client starts transmission of backup data of the backup job (step ①). For example, if the quantity of real-time available parallel threads is 2, two backup jobs can be scheduled currently. Therefore, the scheduling ranking module selects two backup jobs (for example, Job Ids are 1 and 2) from the queue head of the scheduling queue, and sends a scheduling indication including the Job Id 1 and the Job Id 2 to the client.

After the backup job is started, the scheduling ranking module sends a rate limiting start indication to the rate limiting decision module, where the rate limiting start indication includes the identifier (Job Id) of the started backup job and a time (create time) at which the scheduling ranking module actually starts the job (step ②).

After receiving the rate limiting start indication, the rate limiting decision module obtains a rate limit of the started backup job in a next periodicity, and then sends a rate limiting indication to the client, where the rate limiting indication includes the identifier (Job Id) of the started backup job and the rate limit (step ③), so that the client performs source-end transmit rate limiting based on the rate limit.

After completing a backup job, the client may send a job completion measurement feedback to the machine learning model training module, where the job completion measurement feedback includes an identifier (Job Id) of the completed backup job, a total volume of data backed up in a last backup of the backup job, and a job completion time (JCT) of the backup job in the last backup (step ④). The feedback may enable the machine learning model training module to train and update a machine learning model based on the information that is fed back.

Figure 9:
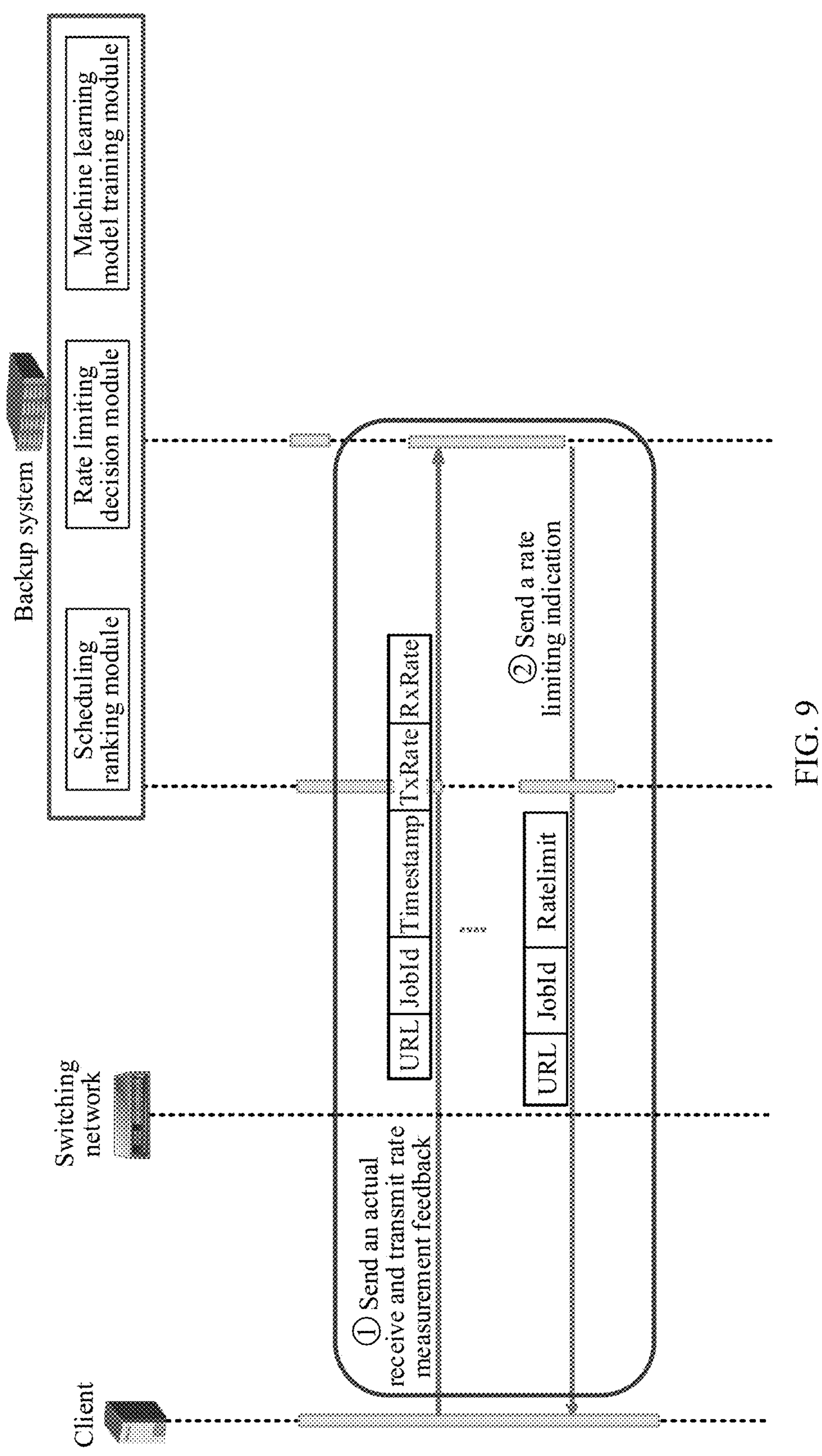
FIG. 9 is an example diagram of a rate limit calculation procedure according to an embodiment of this application.

FIG. 9 is an example diagram of a rate limit calculation procedure. As shown in FIG. 9, for a started backup job, the client periodically (for example, every 10 ms, every 1s, every minute, or every 5 minutes, where a periodicity is not limited) sends an actual receive and transmit rate measurement feedback to the rate limiting decision module, where the actual receive and transmit rate measurement feedback includes an identifier (Job Id) of the started backup job, a timestamp, a receive rate (RxRate), and a transmit rate (TxRate) (step ①). RxRate may be an average receive rate in a last periodicity, and TxRate may be an average transmit rate in the last periodicity.

The rate limiting decision module invokes the machine learning model, and inputs RxRate and TxRate, to output a predicted receive rate of the started job in a next periodicity.

For the started backup job, the rate limiting decision module calculates a rate limit of the backup job in the next periodicity according to the following formula:

$$\text{Rate limit of a backup job } i = \frac{\text{Preset bandwidth of the first port} \times \text{Predicted receive rate of the backup job } i}{\text{Sum of the predicted receive rates of all the backup jobs transmitted by the first port}}$$

The first port is a transmission port of the backup job i.

After obtaining the rate limit of the backup job i, the rate limiting decision module sends a rate limiting indication to the client, where the rate limiting indication includes the identifier (Job Id) of the started backup job and the rate limit (step 2)), so that the client performs source-end transmit rate limiting based on the rate limit.

Figure 10:
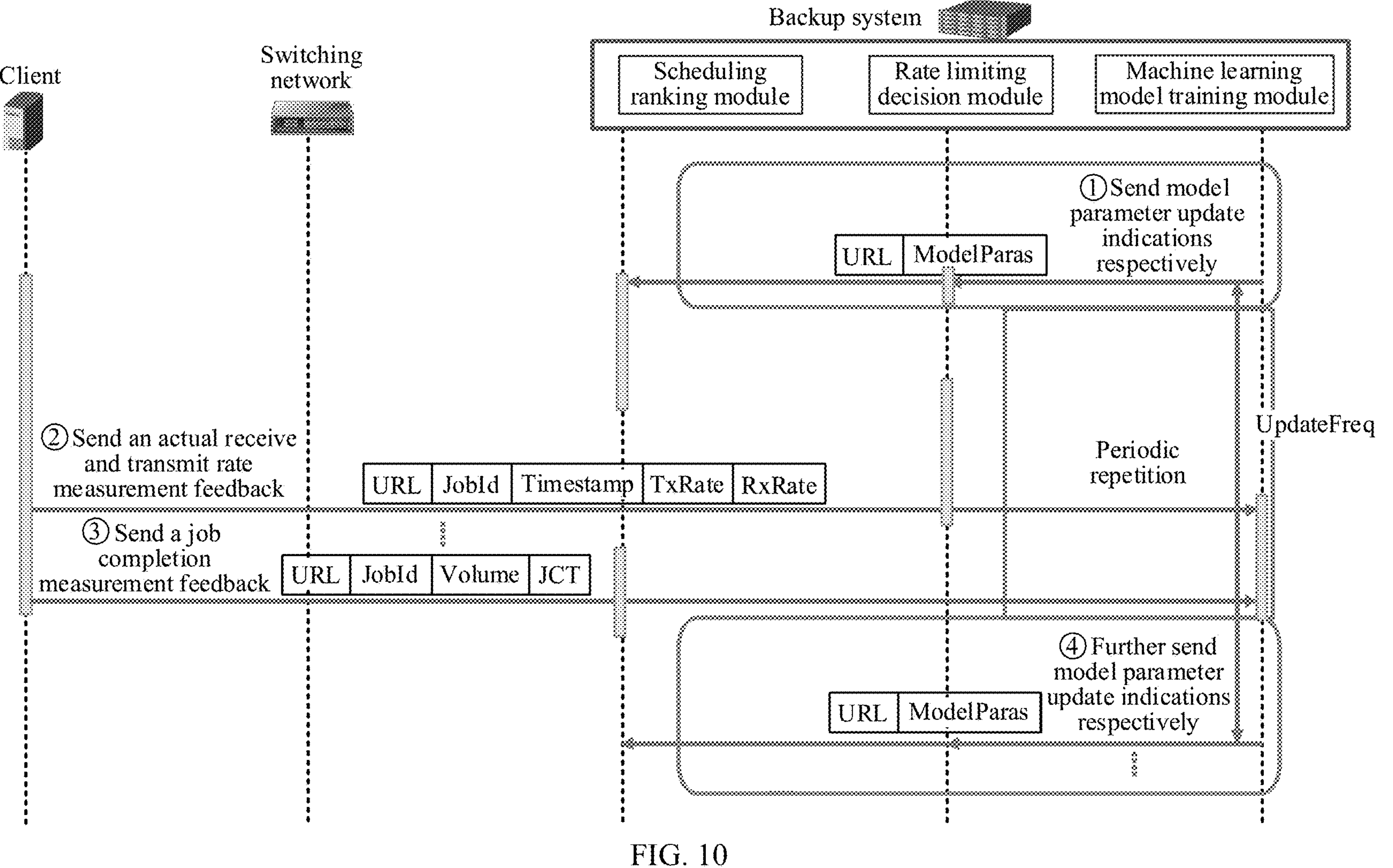
FIG. 10 is an example diagram of a machine learning model training procedure according to an embodiment of this application.

FIG. 10 is an example diagram of a machine learning model training procedure. As shown in FIG. 10, the machine learning model training module may periodically (for example, every week, every month, or every quarter, where a periodicity is not limited) update parameters of the machine learning models. The parameter may include a structure of the machine learning model, a parameter of one or more layers included in the machine learning model, and the like.

When a last periodicity ends, the machine learning model training module sends model parameter update indications respectively to the scheduling ranking module and the rate limiting decision module, where the model parameter update indications include updated model parameters (ModelParas) (step ①), so that the scheduling ranking module and the rate limiting decision module may update local machine learning models based on the updated model parameters.

After entering a next periodicity, for a started backup job, the client periodically (for example, every 10 ms, every 1s, every minute, or every 5 minutes, where a periodicity is not limited) sends an actual receive and transmit rate measurement feedback to the rate limiting decision module, where the actual receive and transmit rate measurement feedback includes an identifier (Job Id) of the started backup job, a timestamp, a receive rate (RxRate), and a transmit rate (TxRate) (step ②). RxRate may be an average receive rate in the last periodicity, and TxRate may be an average transmit rate in the last periodicity. The feedback may enable the machine learning model training module to train and update a machine learning model based on the information that is fed back.

After completing a backup job, the client may send a job completion measurement feedback to the machine learning model training module, where the job completion measurement feedback includes an identifier (Job Id) of the completed backup job, a total volume of data backed up in a last backup of the backup job, and a job completion time (JCT) of the backup job in the last backup (step ③). The feedback may enable the machine learning model training module to train and update a machine learning model based on the information that is fed back.

Figure 11:
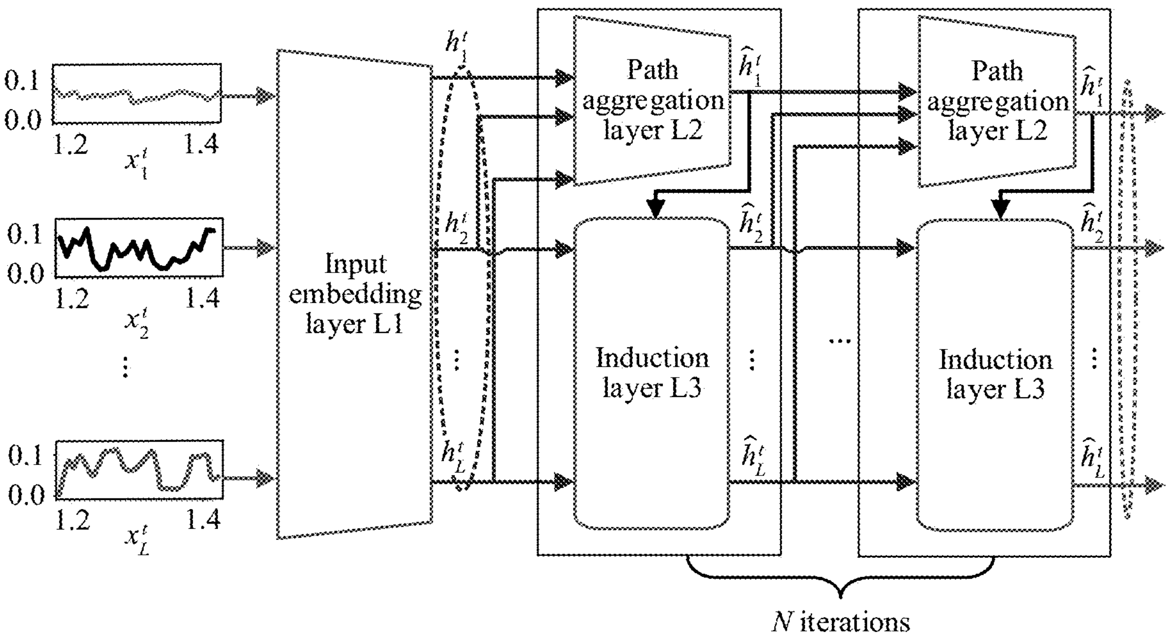
FIG. 11 is an example structural diagram of a machine learning model according to an embodiment of this application.

When training the machine learning model, the machine learning model training module may perform training based on a structure of the machine learning model shown in FIG. 11. As shown in FIG. 11, the machine learning model (for example, a flow neural network (FlowNN), a convolutional network, or a deep network) is a multi-layer neural network model, and mainly includes an input embedding layer L1, a path aggregation layer (PathAggregator) L2, and an induction layer L3. L1 is mainly used to map input feature data to a high-dimensional space. L2 aggregates moment information output by L1 and performs recursion along a time dimension. L3 predicts a real-time receive rate of a job based on outputs of L1 and L2. It should be noted that FIG. 11 is from X. Cheng et al., "Physics constrained flow neural network for short-timescale predictions in data communications networks", ArXiv, https://arxiv.org/pdf/2112.12321.pdf.

Optionally, the machine learning model training module inputs backup data volumes of historically executed backup jobs of service objects and job completion times JCTs of the backup jobs into L1, then L2 aggregates all the input information, and finally, an output of L2 is directly mapped as predicted backup data volumes and predicted job completion times of the plurality of service objects by using a fully-connected network. In this process, only L1 and L2 in the machine learning model participate. The machine learning model training module compares the predicted backup data volumes and the predicted job completion times of the plurality of service objects with actual backup data volumes and actual job completion times of current backup jobs of the plurality of service objects, and converges the machine learning model based on a loss between the two, to obtain an updated parameter of the machine learning model.

Optionally, the machine learning model training module inputs a receive rate (RxRate) and a transmit rate (TxRate) of each service object in a last periodicity into L1, and after calculation of L1, L2, and L3, outputs of L2 and L3 are directly mapped as predicted receive rates of backup jobs of the plurality of service objects in a next periodicity by using a fully-connected network. The machine learning model training module compares the predicted receive rates with actual receive rates of current backup jobs of the plurality of service objects, and converges the machine learning model based on a loss between the two, to obtain an updated parameter of the machine learning model.

It should be noted that, other than the foregoing two model training methods, in this application, other related job transmission characteristics and system status feature data that can be collected may be used as an input to train the machine learning model. This is not specifically limited herein.

When the next periodicity ends, the machine learning model training module further sends model parameter update indications respectively to the scheduling ranking module and the rate limiting decision module, where the model parameter update indications include updated model parameters (ModelParas) (step so that the scheduling ranking module and the rate limiting decision module may update the local machine learning models based on the updated model parameters.

It should be noted that, in one machine learning model training periodicity, the client may perform the foregoing step 2 and step for a plurality of times. In this way, input data used by the machine learning model training module may be data carried in a plurality of feedbacks from the client that are received in one training periodicity.

Figure 12:
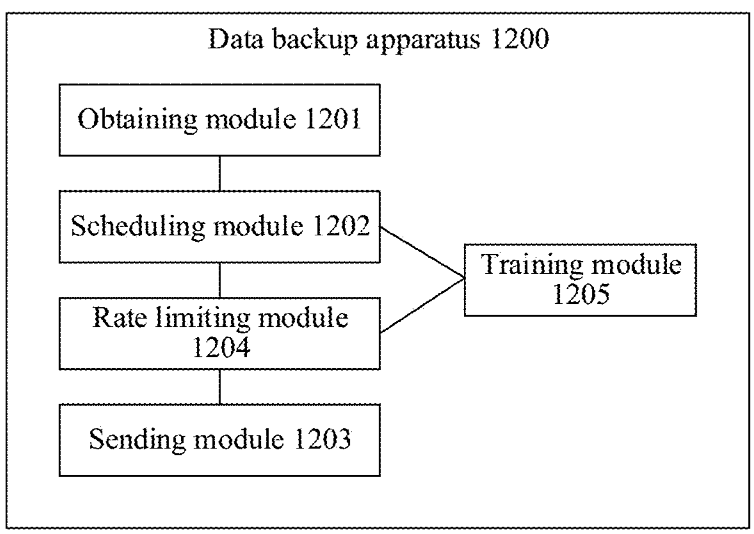
FIG. 12 is an example structural diagram of a data backup apparatus 1200 according to an embodiment of this application.

FIG. 12 is an example structural diagram of a data backup apparatus 1200 according to an embodiment of this application. As shown in FIG. 12, the data backup apparatus 1200 in this embodiment may be used in a backup system. The data backup apparatus 1200 may include an obtaining module 1201, a scheduling module 1202, a sending module 1203, a rate limiting module 1204, and a training module 1205.

The obtaining module 1201 is configured to obtain first backup data volumes and first job completion times of a plurality of service objects. The first backup data volumes and the first job completion times correspond to last backup jobs of the plurality of service objects. The scheduling module 1202 is configured to obtain a scheduling sequence of next backup jobs of the plurality of service objects based on the first backup data volumes and the first job completion times. The sending module 1203 is configured to send a scheduling indication to a client based on the scheduling sequence of the next backup jobs of the plurality of service objects. The scheduling indication includes an identifier of a service object corresponding to a backup job that is to be scheduled.

In a possible implementation, the scheduling module 1202 is configured to input the first backup data volumes and the first job completion times into a first machine learning model, to obtain the scheduling sequence of the next backup jobs of the plurality of service objects.

In a possible implementation, the scheduling module 1202 is configured to: input the first backup data volumes and the first job completion times into a second machine learning model, to obtain second backup data volumes and second job completion times of the plurality of service objects, where the second backup data volumes and the second job completion times correspond to the next backup jobs of the plurality of service objects; and obtain the scheduling sequence of the next backup jobs of the plurality of service objects based on the second backup data volumes and the second job completion times.

In a possible implementation, the scheduling module 1202 is configured to: calculate a ratio of a second backup data volume corresponding to a first service object to a second job completion time corresponding to the first service object, to obtain an easiness degree of a next backup job of the first service object, where the first service object is any one of the plurality of service objects; obtain a remaining start time of the next backup job of the first service object based on the second job completion time corresponding to the first service object; and after easiness degrees of the next backup jobs of the plurality of service objects and remaining start times of the next backup jobs of the plurality of service objects are all obtained, obtain the scheduling sequence of the next backup jobs of the plurality of service objects based on the easiness degrees of the next backup jobs of the plurality of service objects and the remaining start times of the next backup jobs of the plurality of service objects.

In a possible implementation, the scheduling module 1202 is further configured to: determine whether to cancel the next backup job of the first service object; and when the next backup job of the first service object is not canceled, obtain the scheduling sequence of the next backup jobs of the plurality of service objects based on the easiness degrees of the next backup jobs of the plurality of service objects and the remaining start times of the next backup jobs of the plurality of service objects.

In a possible implementation, the scheduling module 1202 is configured to: calculate ratios of the easiness degrees of the next backup jobs of the plurality of service objects to the remaining start times of the next backup jobs of the plurality of service objects, to obtain scheduling thresholds of the next backup jobs of the plurality of service objects; and rank the thresholds of the next backup jobs of the plurality of service objects in descending order, to obtain the scheduling sequence of the next backup jobs of the plurality of service objects.

In a possible implementation, the scheduling module 1202 is configured to: determine whether the remaining start time of the next backup job of the first service object is less than 0; when the remaining start time of the next backup job of the first service object is less than 0, calculate a cancellation probability of the next backup job of the first service object; and when the cancellation probability of the next backup job of the first service object is greater than a preset threshold, determine to cancel the next backup job of the first service object.

In a possible implementation, the scheduling module 1202 is further configured to: when the remaining start time of the next backup job of the first service object is greater than or equal to 0, determine not to cancel the next backup job of the first service object.

In a possible implementation, the scheduling module 1202 is further configured to: when the cancellation probability of the next backup job of the first service object is less than or equal to the preset threshold, determine not to cancel the next backup job of the first service object.

In a possible implementation, the rate limiting module 1204 is configured to: receive a transmit rate and a receive rate of a backup job of a second service object in a last periodicity that are sent by the client, where the backup job of the second service object is being executed; and obtain a rate limit of the backup job of the second service object in a next periodicity based on the transmit rate and the receive rate. The sending module 1203 is further configured to send a rate limiting indication to the client, where the rate limiting indication includes the rate limit of the backup job of the second service object in the next periodicity.

In a possible implementation, the rate limiting module 1204 is configured to: input the transmit rate and the receive rate into a third machine learning model, to obtain a receive rate of the backup job of the second service object in the next periodicity; and obtain the rate limit of the backup job of the second service object in the next periodicity based on the receive rate of the backup job of the second service object in the next periodicity.

In a possible implementation, the rate limiting module 1204 is configured to: obtain a preset bandwidth of a first port, where the first port is configured to execute the backup job of the second service object; obtain a sum of receive rates, in the next periodicity, of all backup jobs transmitted by the first port; and obtain the rate limit of the backup job of the second service object in the next periodicity based on the preset bandwidth of the first port, the receive rate of the backup job of the second service object in the next periodicity, and the sum of the receive rates.

In a possible implementation, the training module 1205 is configured to obtain a target machine learning model through training, where the target machine learning model includes at least one of the first machine learning model, the second machine learning model, and the third machine learning model, the first machine learning model is used to predict a scheduling sequence of next backup jobs of service objects, the second machine learning model is used to predict a second backup data volume and a second job completion time of a service object, and the third machine learning model is used to predict a receive rate of a backup job of a service object in a next periodicity.

In a possible implementation, the training module 1205 is configured to: obtain historical backup data volumes and historical job completion times of the plurality of service objects, where the historical backup data volumes and the historical job completion times correspond to completed backup jobs of the plurality of service objects; obtain a preset machine learning model; input the historical backup data volumes and the historical job completion times of the plurality of service objects into the preset machine learning model, to obtain predicted backup data volumes and predicted job completion times of the plurality of service objects; and perform convergence training based on the predicted backup data volumes and the predicted job completion times to obtain the target machine learning model.

In a possible implementation, the training module 1205 is configured to: obtain historical receive rates and historical transmit rates of the completed backup jobs of the plurality of service objects; obtain a preset machine learning model; input the historical receive rates and the historical transmit rates into the preset machine learning model, to obtain predicted receive rates of backup jobs of the plurality of service objects; and perform convergence training based on the predicted receive rates to obtain the target machine learning model.

The apparatus in this embodiment may be configured to execute the technical solution in either of the method embodiments shown in FIG. 3 to FIG. 4. The implementation principles and technical effects thereof are similar. Details are not described herein again.

In an implementation process, steps in the foregoing method embodiments may be implemented by using a hardware integrated logical circuit in the processor, or by using instructions in a form of software. The processor may be a general-purpose processor, a digital signal processor (DSP), an application-specific integrated circuit (ASIC), a field-programmable gate array (FPGA) or another programmable logic device, a discrete gate or transistor logic device, or a discrete hardware component. The general-purpose processor may be a microprocessor, or the processor may be any conventional processor or the like. Steps of the methods disclosed in embodiments of this application may be directly presented as being completed by a hardware encoding processor, or completed by a combination of hardware in the encoding processor and a software module. The software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing methods in combination with hardware of the processor.

The memory in the foregoing embodiments may be a volatile memory or a non-volatile memory, or may include both a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus random access memory (direct rambus RAM, DR RAM). It should be noted that, the memory in the systems and methods described in this specification aims to include but is not limited to these memories and any memory of another proper type.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and there may be another division manner in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located at one position, or may be distributed on a plurality of network units. A part or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions in this application essentially, or a part contributing to a conventional technology, or a part of the technical solutions may be implemented in a form of a software product. The computer software product is stored in a storage medium and includes several instructions for instructing a computer device (a personal computer, a server, a network device, or the like) to perform all or a part of the steps of the methods in embodiments of this application. The storage medium includes various media that can store program code, such as a USB flash drive, a removable hard disk drive, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data backup method, applied to an electronic device, the method comprising:

obtaining first backup data volumes and first job completion times of a plurality of service objects, wherein the first backup data volumes and the first job completion times correspond to last backup jobs of the plurality of service objects;

obtaining a scheduling sequence of next backup jobs of the plurality of service objects based on the first backup data volumes and the first job completion times, including:

inputting the first backup data volumes and the first job completion times into a second machine learning model, to obtain second backup data volumes and second job completion times of the plurality of service objects, wherein the second backup data volumes and the second job completion times correspond to the next backup jobs of the plurality of service objects;

determining a ratio of a second backup data volume corresponding to a first service object to a second job completion time corresponding to the first service object, to obtain an easiness degree of a next backup job of the first service object, wherein the first service object is any one of the plurality of service objects;

obtaining a remaining start time of the next backup job of the first service object based on the second job completion time corresponding to the first service object;

after easiness degrees of the next backup jobs of the plurality of service objects and remaining start times of the next backup jobs of the plurality of service objects are all obtained, obtaining the scheduling sequence of the next backup jobs of the plurality of service objects based on the easiness degrees of the next backup jobs of the plurality of service objects and the remaining start times of the next backup jobs of the plurality of service objects; and sending a scheduling indication to a client based on the scheduling sequence of the next backup jobs of the plurality of service objects, wherein the scheduling indication comprises an identifier of a service object corresponding to a backup job that is to be scheduled.

2. The method according to claim 1, wherein the obtaining the scheduling sequence of the next backup jobs of the plurality of service objects based on the first backup data volumes and the first job completion times comprises:

inputting the first backup data volumes and the first job completion times into a first machine learning model, to obtain the scheduling sequence of the next backup jobs of the plurality of service objects.

3. The method according to claim 1, wherein before the obtaining the scheduling sequence of the next backup jobs of the plurality of service objects based on the easiness degrees of the next backup jobs of the plurality of service objects and the remaining start times of the next backup jobs of the plurality of service objects, the method further comprises:

determining whether to cancel the next backup job of the first service object; and wherein the obtaining the scheduling sequence of the next backup jobs of the plurality of service objects based on the easiness degrees of the next backup jobs of the plurality of service objects and the remaining start times of the next backup jobs of the plurality of service objects comprises:

based on the next backup job of the first service object being not canceled, obtaining the scheduling sequence of the next backup jobs of the plurality of service objects based on the easiness degrees of the next backup jobs of the plurality of service objects and the remaining start times of the next backup jobs of the plurality of service objects.

4. The method according to claim 1, wherein the obtaining the scheduling sequence of the next backup jobs of the plurality of service objects based on the easiness degrees of the next backup jobs of the plurality of service objects and the remaining start times of the next backup jobs of the plurality of service objects comprises:

determining ratios of the easiness degrees of the next backup jobs of the plurality of service objects to the remaining start times of the next backup jobs of the plurality of service objects, to obtain scheduling thresholds of the next backup jobs of the plurality of service objects; and ranking the scheduling thresholds of the next backup jobs of the plurality of service objects in descending order, to obtain the scheduling sequence of the next backup jobs of the plurality of service objects.

5. The method according to claim 3, wherein the determining whether to cancel the next backup job of the first service object comprises:

determining whether the remaining start time of the next backup job of the first service object is less than 0;

based on the remaining start time of the next backup job of the first service object being less than 0, determining a cancellation probability of the next backup job of the first service object; and based on the cancellation probability of the next backup job of the first service object being greater than a preset threshold, determining to cancel the next backup job of the first service object.

6. The method according to claim 5, wherein after the determining whether the remaining start time of the next backup job of the first service object is less than 0, the method further comprises:

based on the remaining start time of the next backup job of the first service object being greater than or equal to 0, determining not to cancel the next backup job of the first service object.

7. The method according to claim 5, wherein after the determining the cancellation probability of the next backup job of the first service object, the method further comprises:

based on the cancellation probability of the next backup job of the first service object being less than or equal to the preset threshold, determining not to cancel the next backup job of the first service object.

8. The method according to claim 1, wherein after the sending the scheduling indication to the client based on the scheduling sequence of the next backup jobs of the plurality of service objects, the method further comprises:

receiving a transmit rate and a receive rate of a backup job of a second service object in a last periodicity that are sent by the client, wherein the backup job of the second service object is being executed;

obtaining a rate limit of the backup job of the second service object in a next periodicity based on the transmit rate and the receive rate; and sending a rate limiting indication to the client, wherein the rate limiting indication comprises the rate limit of the backup job of the second service object in the next periodicity.

9. The method according to claim 8, wherein the obtaining the rate limit of the backup job of the second service object in the next periodicity based on the transmit rate and the receive rate comprises:

inputting the transmit rate and the receive rate into a third machine learning model, to obtain a receive rate of the backup job of the second service object in the next periodicity; and obtaining the rate limit of the backup job of the second service object in the next periodicity based on the receive rate of the backup job of the second service object in the next periodicity.

10. The method according to claim 9, wherein the obtaining the rate limit of the backup job of the second service object in the next periodicity based on the receive rate of the backup job of the second service object in the next periodicity comprises:

obtaining a preset bandwidth of a first port, wherein the first port is configured to execute the backup job of the second service object;

obtaining a sum of receive rates, in the next periodicity, of all backup jobs whose backup data is transmitted by the first port; and obtaining the rate limit of the backup job of the second service object in the next periodicity based on the preset bandwidth of the first port, the receive rate of the backup job of the second service object in the next periodicity, and the sum of the receive rates.

11. The method according to claim 1, further comprising: obtaining a target machine learning model through training, wherein the target machine learning model comprises at least one of a first machine learning model, the second machine learning model, and a third machine learning model, the first machine learning model is used to predict a scheduling sequence of next backup jobs of service objects, the second machine learning model is used to predict a second backup data volume and a second job completion time of a service object, and the third machine learning model is used to predict a receive rate of a backup job of a service object in a next periodicity.

12. The method according to claim 11, wherein the obtaining the target machine learning model through training comprises:

obtaining historical backup data volumes and historical job completion times of the plurality of service objects, wherein the historical backup data volumes and the historical job completion times correspond to completed backup jobs of the plurality of service objects;

obtaining a preset machine learning model;

inputting the historical backup data volumes and the historical job completion times of the plurality of service objects into the preset machine learning model, to obtain predicted backup data volumes and predicted job completion times of the plurality of service objects; and performing convergence training based on the predicted backup data volumes and the predicted job completion times to obtain the target machine learning model.

13. The method according to claim 11, wherein the obtaining the target machine learning model through training comprises:

obtaining historical receive rates and historical transmit rates of completed backup jobs of the plurality of service objects;

obtaining a preset machine learning model;

inputting the historical receive rates and the historical transmit rates into the preset machine learning model, to obtain predicted receive rates of backup jobs of the plurality of service objects; and performing convergence training based on the predicted receive rates to obtain the target machine learning model.

14. A backup apparatus, comprising:

one or more processors; and a memory, configured to store one or more programs, wherein upon the one or more programs being executed by the one or more processors, the one or more processors are enabled to implement a method comprising:

obtaining first backup data volumes and first job completion times of a plurality of service objects, wherein the first backup data volumes and the first job completion times correspond to last backup jobs of the plurality of service objects;

obtaining a scheduling sequence of next backup jobs of the plurality of service objects based on the first backup data volumes and the first job completion times, including:

inputting the first backup data volumes and the first job completion times into a second machine learning model, to obtain second backup data volumes and second job completion times of the plurality of service objects, wherein the second backup data volumes and the second job completion times correspond to the next backup jobs of the plurality of service objects;

determining a ratio of a second backup data volume corresponding to a first service object to a second job completion time corresponding to the first service object, to obtain an easiness degree of a next backup job of the first service object, wherein the first service object is any one of the plurality of service objects;

obtaining a remaining start time of the next backup job of the first service object based on the second job completion time corresponding to the first service object;

after easiness degrees of the next backup jobs of the plurality of service objects and remaining start times of the next backup jobs of the plurality of service objects are all obtained, obtaining the scheduling sequence of the next backup jobs of the plurality of service objects based on the easiness degrees of the next backup jobs of the plurality of service objects and the remaining start times of the next backup jobs of the plurality of service objects; and sending a scheduling indication to a client based on the scheduling sequence of the next backup jobs of the plurality of service objects, wherein the scheduling indication comprises an identifier of a service object corresponding to a backup job that is to be scheduled.

15. The apparatus according to claim 14, wherein the obtaining the scheduling sequence of the next backup jobs of the plurality of service objects based on the first backup data volumes and the first job completion times comprises:

inputting the first backup data volumes and the first job completion times into a first machine learning model, to obtain the scheduling sequence of the next backup jobs of the plurality of service objects.

16. The apparatus according to claim 14, wherein before the obtaining the scheduling sequence of the next backup jobs of the plurality of service objects based on the easiness degrees of the next backup jobs of the plurality of service objects and the remaining start times of the next backup jobs of the plurality of service objects, the method further comprises:

determining whether to cancel the next backup job of the first service object; and wherein the obtaining the scheduling sequence of the next backup jobs of the plurality of service objects based on the easiness degrees of the next backup jobs of the plurality of service objects and the remaining start times of the next backup jobs of the plurality of service objects comprises:

based on the next backup job of the first service object being not canceled, obtaining the scheduling sequence of the next backup jobs of the plurality of service objects based on the easiness degrees of the next backup jobs of the plurality of service objects and the remaining start times of the next backup jobs of the plurality of service objects.

17. The apparatus according to claim 14, wherein the obtaining the scheduling sequence of the next backup jobs of the plurality of service objects based on the easiness degrees of the next backup jobs of the plurality of service objects and the remaining start times of the next backup jobs of the plurality of service objects comprises:

determining ratios of the easiness degrees of the next backup jobs of the plurality of service objects to the remaining start times of the next backup jobs of the plurality of service objects, to obtain scheduling thresholds of the next backup jobs of the plurality of service objects; and ranking the scheduling thresholds of the next backup jobs of the plurality of service objects in descending order, to obtain the scheduling sequence of the next backup jobs of the plurality of service objects.

18. The apparatus according to claim 16, wherein the determining whether to cancel the next backup job of the first service object comprises:

determining whether the remaining start time of the next backup job of the first service object is less than 0;

based on the remaining start time of the next backup job of the first service object being less than 0, determining a cancellation probability of the next backup job of the first service object; and based on the cancellation probability of the next backup job of the first service object being greater than a preset threshold, determining to cancel the next backup job of the first service object.

19. The apparatus according to claim 18, wherein after the determining whether the remaining start time of the next backup job of the first service object is less than 0, the method further comprises:

based on the remaining start time of the next backup job of the first service object being greater than or equal to 0, determining not to cancel the next backup job of the first service object.

20. The apparatus according to claim 18, wherein after the determining the cancellation probability of the next backup job of the first service object, the method further comprises:

based on the cancellation probability of the next backup job of the first service object being less than or equal to the preset threshold, determining not to cancel the next backup job of the first service object.

* * * * *